United States Patent [19]
Yamamoto et al.

[11] Patent Number: 6,073,717
[45] Date of Patent: Jun. 13, 2000

[54] ELECTRIC MOTOR ASSISTED VEHICLE

[75] Inventors: Satoshi Yamamoto; Hironori Nakayama, both of Iwata, Japan

[73] Assignee: Yamaha Hatsudoki Kabushiki Kaisha, Japan

[21] Appl. No.: 08/887,152

[22] Filed: Jul. 2, 1997

[30] Foreign Application Priority Data

Jul. 3, 1996 [JP] Japan ................................ 8-173789
Jul. 4, 1996 [JP] Japan ................................ 8-174945

[51] Int. Cl.⁷ ................................................ B63K 11/00
[52] U.S. Cl. .......................... 180/205; 180/206; 180/220
[58] Field of Search ..................... 180/65.2, 65.6, 180/205, 206, 207, 218, 219, 230; 280/259

[56] References Cited

U.S. PATENT DOCUMENTS

| | | | |
|---|---|---|---|
| 5,505,277 | 4/1996 | Suganuma et al. | 180/206 |
| 5,570,752 | 11/1996 | Takata | 180/206 |
| 5,749,429 | 5/1998 | Yamauchi et al. | 180/205 |
| 5,758,736 | 6/1998 | Yamauchi | 180/220 |
| 5,845,727 | 12/1998 | Miyazawa et al. | 180/205 |
| 5,909,781 | 6/1999 | Yonekawa et al. | 180/206 |
| 5,924,511 | 7/1999 | Takata | 180/205 |
| 5,937,962 | 8/1999 | Yokayama | 180/205 |

FOREIGN PATENT DOCUMENTS

| | | |
|---|---|---|
| 650887 | 5/1995 | European Pat. Off. . |
| 712779 | 5/1996 | European Pat. Off. . |
| 739812 | 10/1996 | European Pat. Off. . |
| 3623800 | 4/1987 | Germany ................ 180/65.2 |
| 004027365A | 3/1992 | Germany ................ 180/65.2 |
| 405238461A | 9/1993 | Japan .................... 180/65.2 |

*Primary Examiner*—Paul N. Dickson
*Assistant Examiner*—Daniel Yeagley
*Attorney, Agent, or Firm*—Knobbe, Martens, Olson & Bear, LLP

[57] ABSTRACT

Several embodiments of electric power-assisted manually powered vehicles such as bicycles. In these embodiments, the drive unit and control are mounted as a unit so as to minimize external wiring and to facilitate heat transfer from the control unit to the atmosphere while protecting the control unit. In some embodiments, sensors for the control unit are also mounted on the outer housing and cooperate with the internal components of the outer housing so as to provide the necessary signals for control.

19 Claims, 21 Drawing Sheets

ELECTRIC MOTOR ASSISTED VEHICLE

BACKGROUND OF THE INVENTION

This invention relates to an electric motor assisted vehicle and more particularly to an improved drive assembly and control therefor.

There have been proposed a class of vehicle wherein the vehicle is powered primarily by a manual input force of the operator. However, there is also incorporated an electric motor assist which provides assist power for assisting the operator's manual propulsion of the associated vehicle. Although the type of vehicle employed for this purpose may be of a wide variety, this type of system is frequently used on land vehicles such as bicycles that have a generally open construction. This does present some problems as will now be described.

Specifically, the type of system generally employs a manual force receiving device such as a pedal operated crank mechanism that drives a transmission for driving an output shaft for propelling the vehicle. An electric motor is employed in conjunction with this pedal operated mechanism for providing electric power assist for driving the vehicle. Generally, at least one sensor is also incorporated in this mechanism that senses the input force of the operator to the pedal operated mechanism. This sensed signal is then sent to a controller which, in turn, controls the transmission of electrical power from a battery to the electric motor for determining the amount of electric power assist.

Conventionally, these structures have been mounted so that the control is spaced from the electric motor and sensor. Obviously this requires connecting wires and also results in the positioning of many of the components in a location where they are exposed. Thus, it has also been the practice to provide some form of outer housing or housings to shield and protect these components. Nevertheless, the construction is quite complicated and costly to build and assemble. The housing assemblies may also interfere with the cooling of heat sensitive components of the control.

It is, therefore, a principal object of this invention to provide an improved electric motor assist mechanism for a manually powered vehicle that is compact and wherein the sensors and control can be positioned in close proximity to each other.

It is a further object of this invention to provide electric power assist for a manually-powered vehicle wherein the power assist mechanism, manual power input, sensors, and control are all formed as part of a single assemblage.

By providing such a component assemblage, it is also possible to sell the unit so that it can be used in a wide variety of vehicles. That is, it is not necessary to have a specially-built vehicle to accommodate the varying components of the mechanism in varying locations.

A type of electric power assisted pedal operated vehicle of the type aforedescribed is shown in U.S. Pat. No. 5,570,752 issued Nov. 5, 1996 and assigned to the assignee hereof. As has been noted, in order to provide the requisite power assist, it is desirable to incorporate a torque sensor which will sense the manual input force to the pedal mechanism. In this way, the output force can be related to the input force so as to maintain a normal feel to the rider of the bicycle while still providing the electrical power assist.

It is also desirable to provide a sensor that senses the speed as this is useful in limiting the amount of power assist to those instances where the power assist is required as when climbing hills or accelerating from a standstill. However, it may be desirable to limit the power assist as the speed of the vehicle increases. The positioning and operation of the torque and speed sensors further complicates the overall construction.

A prior art type of torque sensor is shown in FIG. 1 and will be described by reference to that figure to describe certain of the problems attendant with the prior art type of constructions. In this figure, the outer housing of the crank assemblage is indicated generally by the reference numeral 31. Although the internal description of the crank mechanism will not be described in full detail, reference may be had to aforenoted U.S. Pat. No. 5,570,752 for the details of the construction.

Basically, a crankshaft 32 is supported for rotation within the housing 31 and carries pedals at the outer ends of its crank arms for pedal application of force to the crankshaft 32.

A transmission of a step-up type, which may include a planetary gear set, is interposed between the crankshaft 32 and the output shaft that drives a sprocket for driving the rear wheel of an associated bicycle, if this is the type of vehicle application chosen.

This transmission includes a sun gear that is carried for limited pivotal movement by a torque-sensing member 33. This member 33 has an abutment surface 34 that is adapted to engage a sensor mechanism, indicated generally by the reference numeral 35. This sensor mechanism 35 is mounted within a cavity 36 and includes a potentiometer 37. The potentiometer 37 has a shaft 38 on which a sensor arm 39 is affixed.

This sensor arm is urged by a spring assembly, indicated generally by the reference numeral 41, to resist rotation of the torque-sensing member 33. The spring assembly 41 includes a coil compression spring 42 that bears against a plunger 43 which, in turn, acts on the potentiometer arm 39. The spring 42 is loaded by means of a plate 44 and the plunger 43 has its shaft journaled within a support member 45. The degree of rotation of the potentiometer arm 39 will cause rotation of the potentiometer shaft 38 and will provide an output signal indicative of the operator input torque.

It should be readily apparent that this sensor structure requires a fairly substantial amount of space and also results in the mounting of the component in a way that they can be damaged and hence it is necessary to provide a protective plate 46 which further adds to the bulk of the mechanism and limits its space availability.

Furthermore the sliding engagement between the various components and particularly the plunger 43 and the potentiometer arm 39 and the abutment surface 34 and the arm 39 introduce hysteresis into the system. Also the sliding motion between the plunger 43 and the arm 39 can cause wear. Since all forces are taken by the potentiometer shaft 38 its bearing arrangement must be robust and hence expensive.

It is, therefore, a still further object of this invention to provide an improved sensor assembly for use with an electric power-assisted pedal operated vehicle drive mechanism.

SUMMARY OF THE INVENTION

The features of this invention are adapted to be embodied in an electric motor assisted and manual pedal operated drive assembly for a vehicle and a control therefor. The assembly is comprised of an outer housing for journaling a crankshaft for rotation about a crankshaft axis. The crankshaft has its opposite ends protruding from the outer housing and is adapted to receive crank arms and pedals for application of manual power to the crankshaft. An electric motor has a drive shaft and is supported by the outer housing. An output shaft is journaled by the outer housing for driving the associated vehicle. A transmission is contained within the outer housing for driving the output shaft both from the crankshaft and from the electric motor drive shaft.

In accordance with a first feature of the invention, a control for controlling the operation of the electric motor is mounted directly on the outer housing.

In accordance with another feature of the invention, a sensor for controlling the operation of the electric motor is mounted on a peripheral surface of the outer housing and has a sensor element that penetrates into the interior of the outer housing for collecting data that is transmitted to the portion of the sensor mounted on the exterior of the outer housing.

DETAILED DESCRIPTION OF THE PREFERRED EMBODIMENTS OF THE INVENTION EMBODIMENT OF FIGS. 2–7

Figure 2:
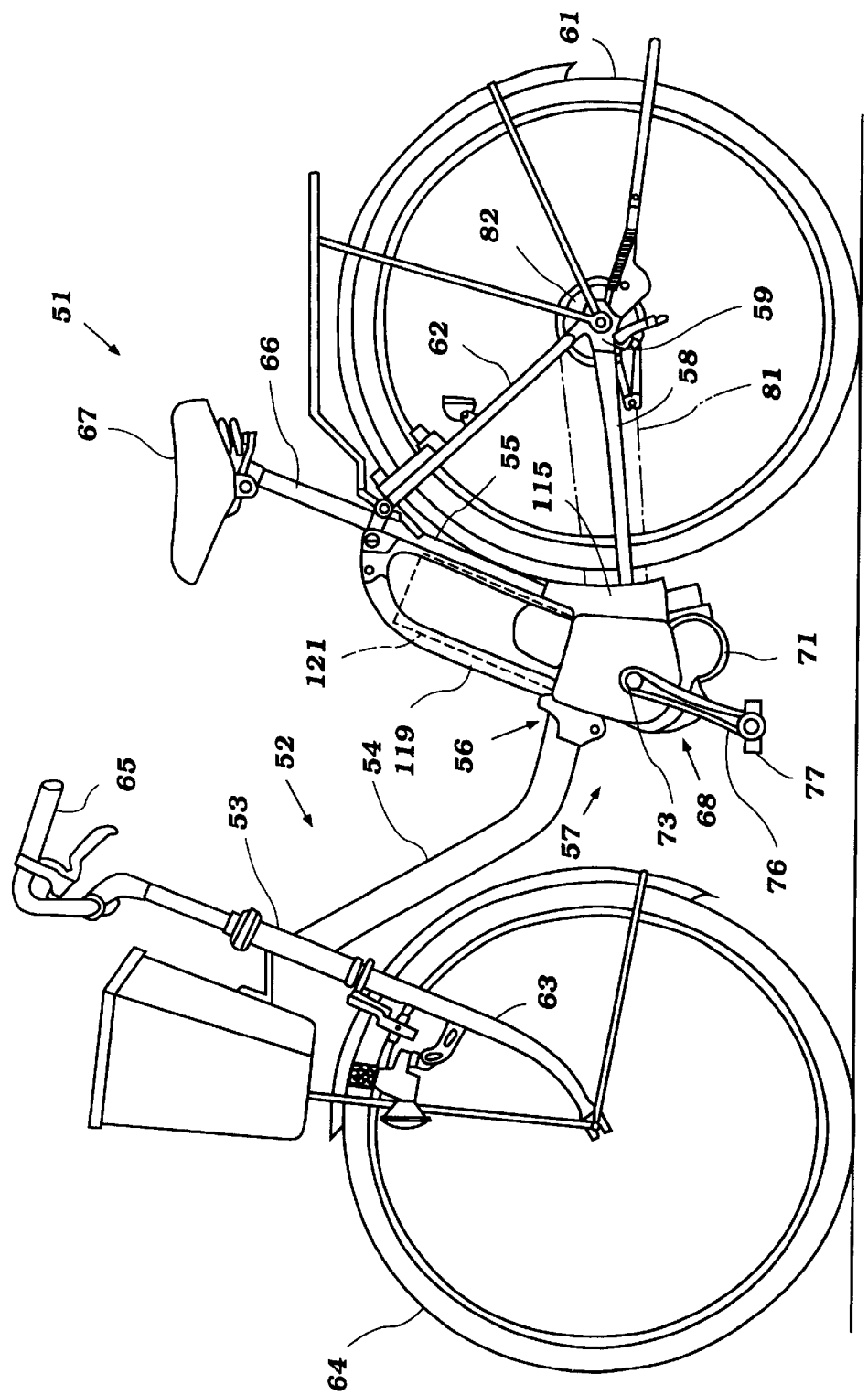
FIG. 2 is a side elevational view of a bicycle constructed in accordance with a first, preferred embodiment of the invention.

A bicycle constructed in accordance with a first embodiment of the invention is illustrated in these figures with the bicycle being shown primarily in FIG. 2. The bicycle is indicated generally by the reference numeral 51 and includes a frame assembly, indicated generally by the reference numeral 52. The frame assembly 52 includes a head pipe 53, down tube 54, and seat tube 55. The down tube 54 and seat tube 55 are connected to each other by a bracket assembly, indicated generally by the reference numeral 56 and which includes the drive unit, indicated generally by the reference numeral 57 which will be described in more detail later by reference to the remaining figures.

A pair of chain stays 58 extend rearwardly from and are connected to the bracket 56. The chain stays 58, in turn, carry a rear wheel bracket 59 on which a rear wheel 61 is rotatably journaled in a known manner. A pair of seat stays 62 extend downwardly from the upper end of the seat tube 55 so as to provide triangular reinforcement for the assembly.

A front fork 63 is journaled by the head tube 53 and rotatably journals a front wheel 64. The front fork 63 is dirigibly supported in the head pipe 53 and carries a handlebar assembly 65 at its upper end for steering of the bicycle 51 in a well-known manner. A seat post 66 is slidably supported in the seat tube 55 and carries a seat 67 on which a seated rider may operate the bicycle 51.

The drive unit 57 will now be described by primary reference to the remaining figures of this embodiment, FIGS. 3–7, although it also appears in FIG. 2. This driving unit includes an outer housing assembly, indicated generally by the reference numeral 68. This outer housing assembly 68 is comprised of a main generally cup-shaped housing member 69. The main housing member 68 defines an internal cavity that is closed by a cover plate 71. The cover plate 71 is held to the main housing assembly 69 by a plurality of threaded fasteners 72.

A crankshaft 73 is journaled by the housing assembly 68 by a first anti-friction bearing 74 that is detachably connected to the cover plate 71 and a second anti-friction bearing 75 that is supported by the main housing piece 69. This second bearing 75 indirectly journals the crankshaft 73 in a manner which will be described.

The crankshaft 73 has affixed to its ends a pair of crank arms 76. These crank arms 76 carry pedals 77 at their outer extremities in a known manner. The crankshaft 73 drives a sprocket 78 which is formed on a tubular bushing 79 through a step up transmission to be described next. The sprocket 78, drives a chain 81 which, in turn, drives the rear wheel 61 through a driven sprocket 82.

The drive from the crankshaft 73 to the driving sprocket 78 is through a step up planetary transmission, indicated generally by the reference numeral 83. This planetary transmission 83 includes a planet gear carrier 84 that encircles the crankshaft 73 and which is driven from it through a one-way clutch 85. A plurality of planet gears 86 are carried by the carrier 84 and are engaged with a ring gear 87.

The ring gear 87 has a hub portion 88 that is journaled for rotation on the crankshaft 73 adjacent the bearing 74. The ring gear 87 acts as part of a force sensing mechanism, indicated generally by the reference numeral 89 and which will be described in more detail later in addition to providing a portion of the planetary transmission 83. That is, the rotation of the ring gear 87 is restricted and this small amount of rotation is used for the purpose of sensing the operator input torque applied to the pedal 77 and crank arm 76.

The planet gears 86 are enmeshed with a sun gear 91 which is formed integrally with a tubular shaft 92 that encircles the crankshaft 73 and which has a splined connection to the tubular sprocket shaft 79 so as to provide rotational interconnection therebetween. The tubular shaft 92 is directly journaled by the bearing 75. Anti-friction bearings 93 are interposed between the interior of the tubular shaft 92 and the end of the crankshaft 73 so that the crankshaft 73 is journaled via the bearings 75 and 93, as should be readily apparent.

An electric assist motor, indicated generally by the reference numeral 94 is also mounted directly by the housing assembly 68. The motor 94 is of any conventional type and includes an outer shell 95 in which is mounted a stator 96 and rotor 97. The rotor 97 drives a motor drive shaft 98. The drive shaft 98 is journaled by a pair of spaced apart bearings 99 formed in the motor housing 95.

The motor drive shaft 98 protrudes into the cavity formed by the outer housing 68 and has affixed to it a drive gear 101 of a step down transmission, indicated generally by the reference numeral 102. This step down transmission includes a first gear and shaft 103 driven directly by the motor drive gear 101 and which is journaled in bearings 104 and 105 carried by the outer housing cover plate 71 and main body portion 69, respectively. This gear 103 is enmeshed with a second gear 106 that drives a transmission output shaft 107 through a one-way clutch 108.

The transmission output shaft 107 is journaled by bearings 109 and 111 carried by the outer housing cover plate 71 and main body portion 69, respectively. The transmission output shaft 107 has affixed to it a further gear 112, which may be formed integrally with the shaft 107. This gear 112 is enmeshed with a further gear 113 that is formed integrally with the sun gear tubular shaft 92 adjacent the sun gear 91.

Therefore, the crank mechanism consisting of the crank arm 76 applies manual force to the driving sprocket 78 through a step-up transmission in which the one-way clutch 85 is interposed. This clutch 85 permits driving of the planet gear carrier 84 when manual force is applied to the crank arm 76 but also permits the carrier 84 to override the crankshaft 73 when coasting.

The one-way clutch 108 permits the electric motor 94 to drive the sprocket 78 but will preclude driving of the motor shaft 98 by the crank mechanism 73. Also, this will preclude driving of the motor 94 when the bicycle is being pushed so that there will be no drag from the motor 94 during pushing operation. The control strategy by which the motor 94 is supplied with electrical power and the source of electrical power will be described later.

Figure 6:
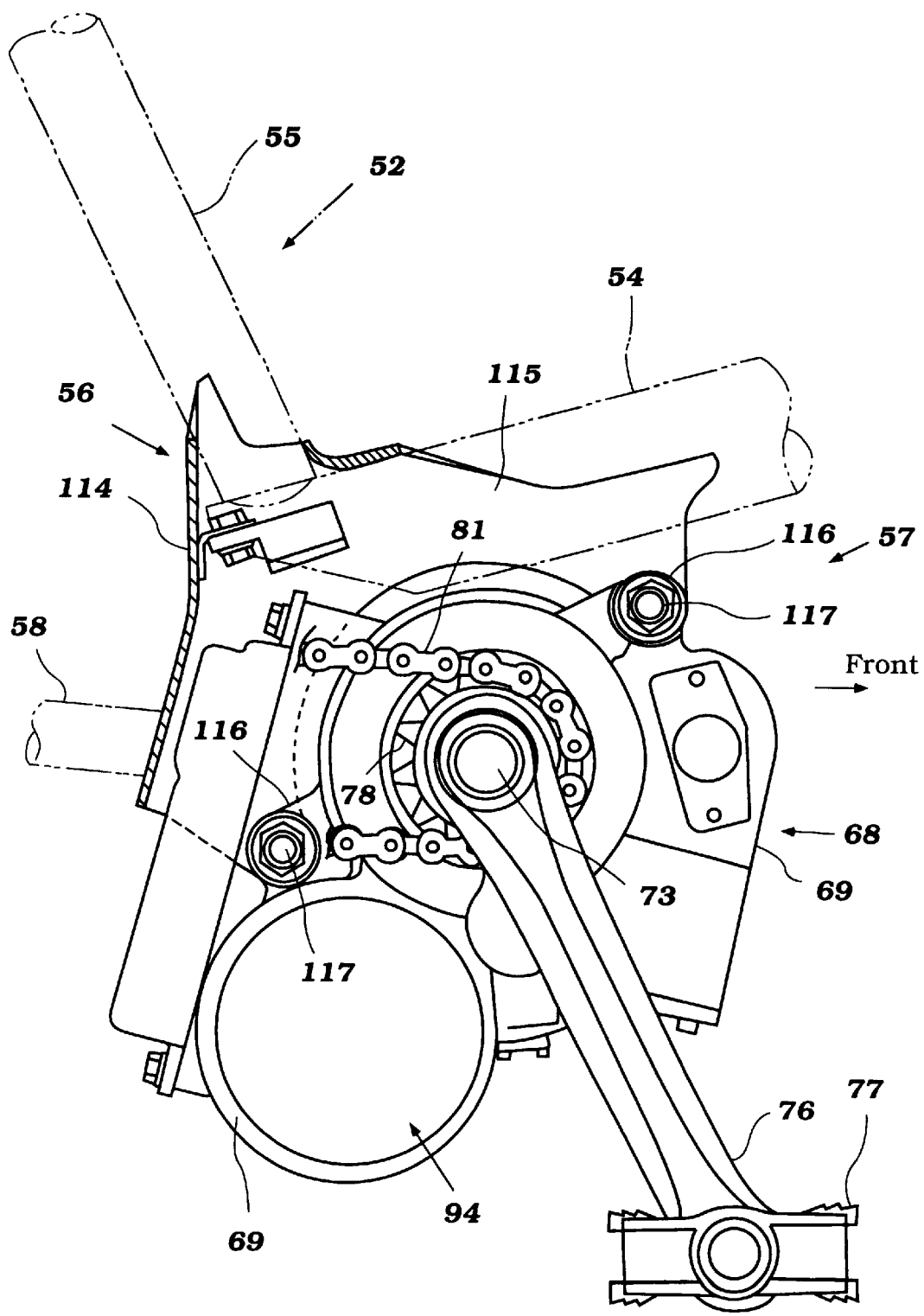
FIG. 6 is a view looking in the opposite direction of FIG. 5 and of the same mechanism and illustrating the components in the same way.
Figure 7:
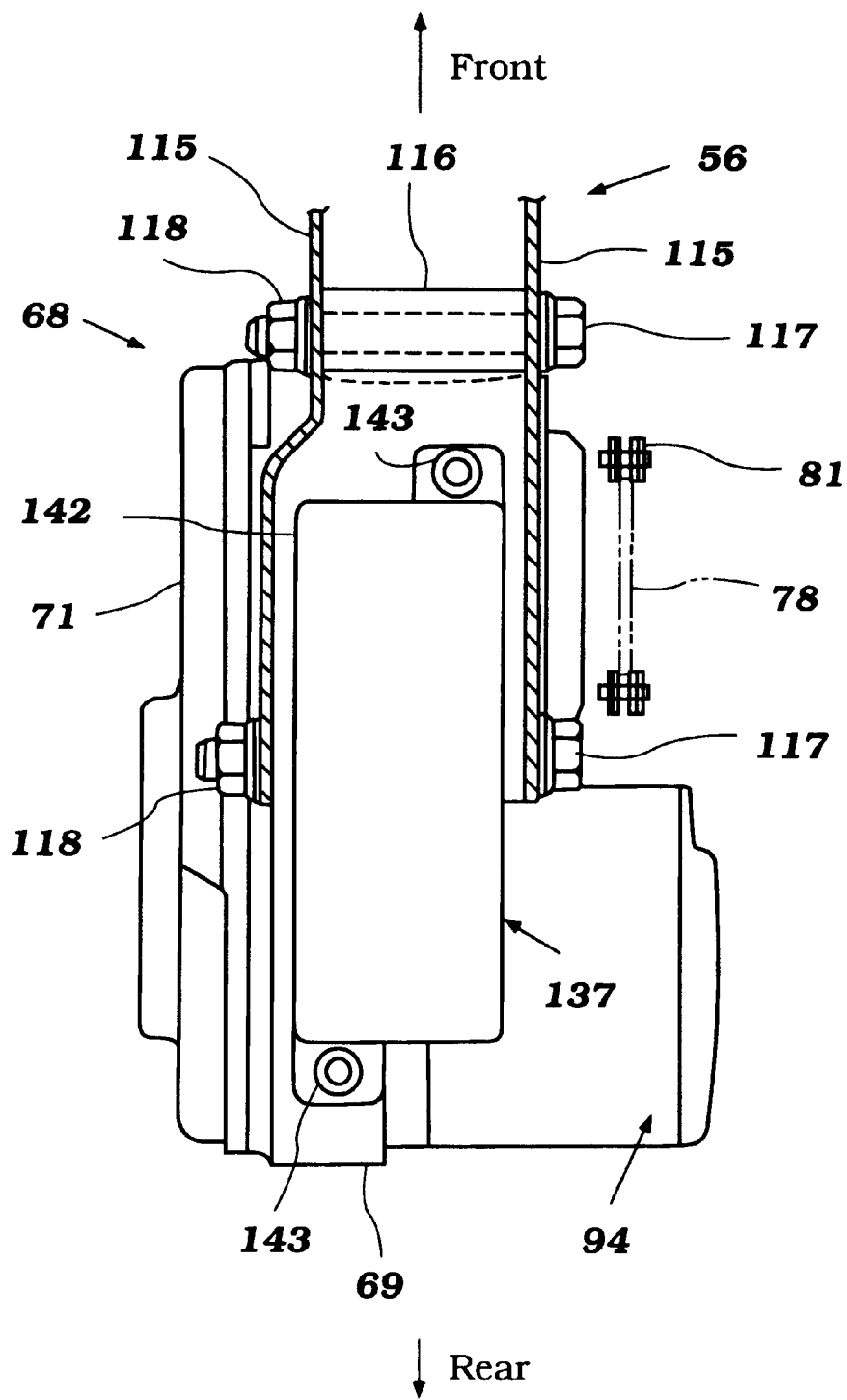
FIG. 7 is a top plan view of the drive unit.

The manner in which the drive unit 57 is mounted on the bracket 56 will now be described by particular reference to FIGS. 5–7 as will the connection between the bracket 56 and the frame members 54, 55, and 58.

The bracket 56 is basically a stamping that has a generally C-shape that is comprised of a joining section 114 which extends generally transversely of the bicycle 51. A pair of forwardly extending leg portions 115 extend on opposite sides of and shield the drive mechanism 68. It should be seen that the forward end of the bracket assembly 56 is generally open. This permits air to flow across the electric motor 94 and the transmission contained within the housing 68 while at the same time protecting the assemblage from foreign objects and particularly from matter that may be thrown up from the rear wheel 61.

The housing assembly 68 is formed with a pair of integral lugs 116 that extend in close proximity to and are abuttingly engaged by the side portions 115 of the bracket 56. Bolt and nut fasteners 117 and 118 pass through the lugs 116 and attach the drive unit 57 to the bracket 56.

The frame tubes 54, 55, and 58 are all welded or otherwise rigidly affixed to the bracket assembly 56 so as to provide a compact and yet high strength assembly.

At the upper side of the bracket 56 there is provided a frame section 119 that extends upwardly in front of the seat post 55. This frame section 119 encloses a battery carrier in which a battery 121 of the rechargeable type is provided. The battery 121 is thus positioned in close proximity to the electric motor 94 and this minimizes the number and extent of external connections.

The control strategy by which the electric motor 94 is energized to provide assist for it may be of any known type. Basically, however, the device operates so as to provide assist power from the electric motor 94 in proportion to the manual force input by the rider to the crank arm 76. This power assist is provided in a speed range of approximately 0 to 15 km per hour during which time the ratio of the auxiliary force to pedal force is approximately equal. As the speed increases above 15 km per hour, the assist ratio is gradually reduced and will reach zero at a speed of approximately 24 km per hour. Thus, the bicycle 51 will ride like a conventional bicycle and give normal pedal feel but require less expenditure of energy from the rider. Obviously the invention may be used with other control strategies.

The described strategy and many other types used obviously requires at least two conditions to be sensed. The first is the manual input force and this is sent by a torque-sensing assembly, that has been previously referred to and which has been indicated by the reference numeral 89. This mechanism will now be described in detail by reference to the two figures where it is primarily shown, these being FIGS. 3 and 4.

As has been noted, the limited rotation of the ring gear 87 is employed as the mechanism for sensing the torque input by the operator. To accomplish this, a lever arm 122 is rigidly affixed to the ring gear 87. This lever arm 122 has an overturned end portion 123 that is associated with a biasing mechanism, indicated generally by the reference numeral 124.

This biasing mechanism includes a coil compression spring 125 that encircles and bears against an end plate 126 that is threaded into a tapped opening 127 formed in the main housing piece 69. A plunger member 128 has its shaft portion supported in a bore 129 formed in this end plate 126. The plunger 128 is engaged by the spring 125 and resists the rotation of the carrier 87 and its arm 122. An adjustable stop 131 determines the at-rest position of the arm 122.

The arm 122 further carries a pin 132 that is received within a groove or slot 133 formed in a follower arm 134.

The follower arm 134 is detachably connected to an input shaft 135 of a potentiometer 136. The potentiometer 136 is mounted on the exterior portion of the main housing member 69.

Figure 5:
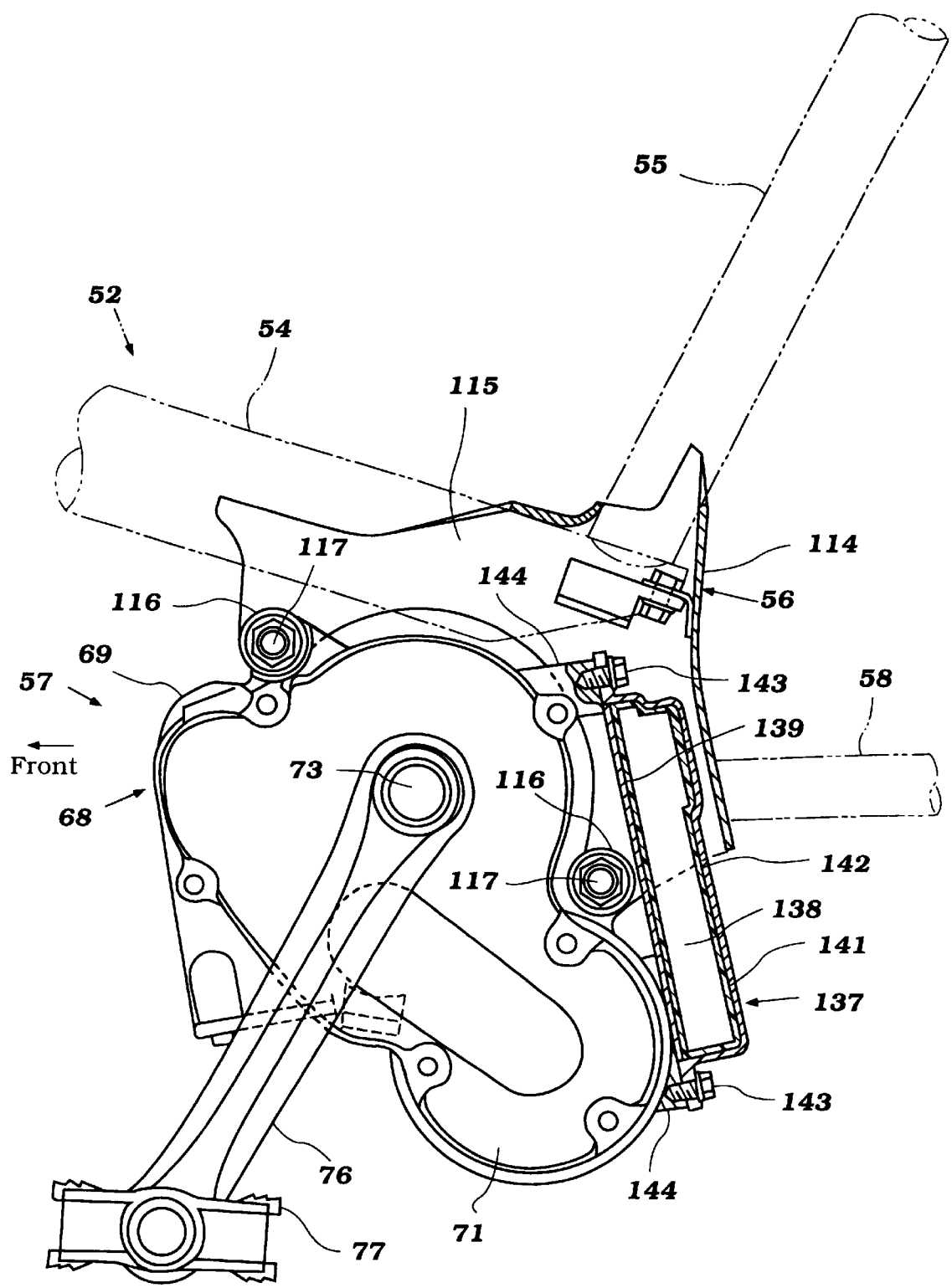
FIG. 5 is an enlarged side elevational view looking in the same direction as FIG. 5 but showing the driving mechanism in solid lines and the associated portion of the bicycle in phantom and with a portion broken away.

The signal from the potentiometer 139 is delivered to a control box indicated generally by the reference numeral 137 and which is shown in some detail in FIG. 5. The control box 137 includes one or more electronic components 138 that are mounted on a substrate 139 and which are enclosed within a protective and heat transferring metal housing 141. A potting compound 142 fills the space around the component 138 and the mounting board 139 and offers them protection.

The metal housing 141 has a pair of tabs that are mounted by mounting screws 143 on lugs 144 formed on the main housing assembly 69. This affords heat transfer for cooling and still places the control box 137 in protected position by the bracket 56. Also, this limits the necessity for external junctions and minimizes the number of external leads that are required and keeps them at a very short length.

Figure 3:
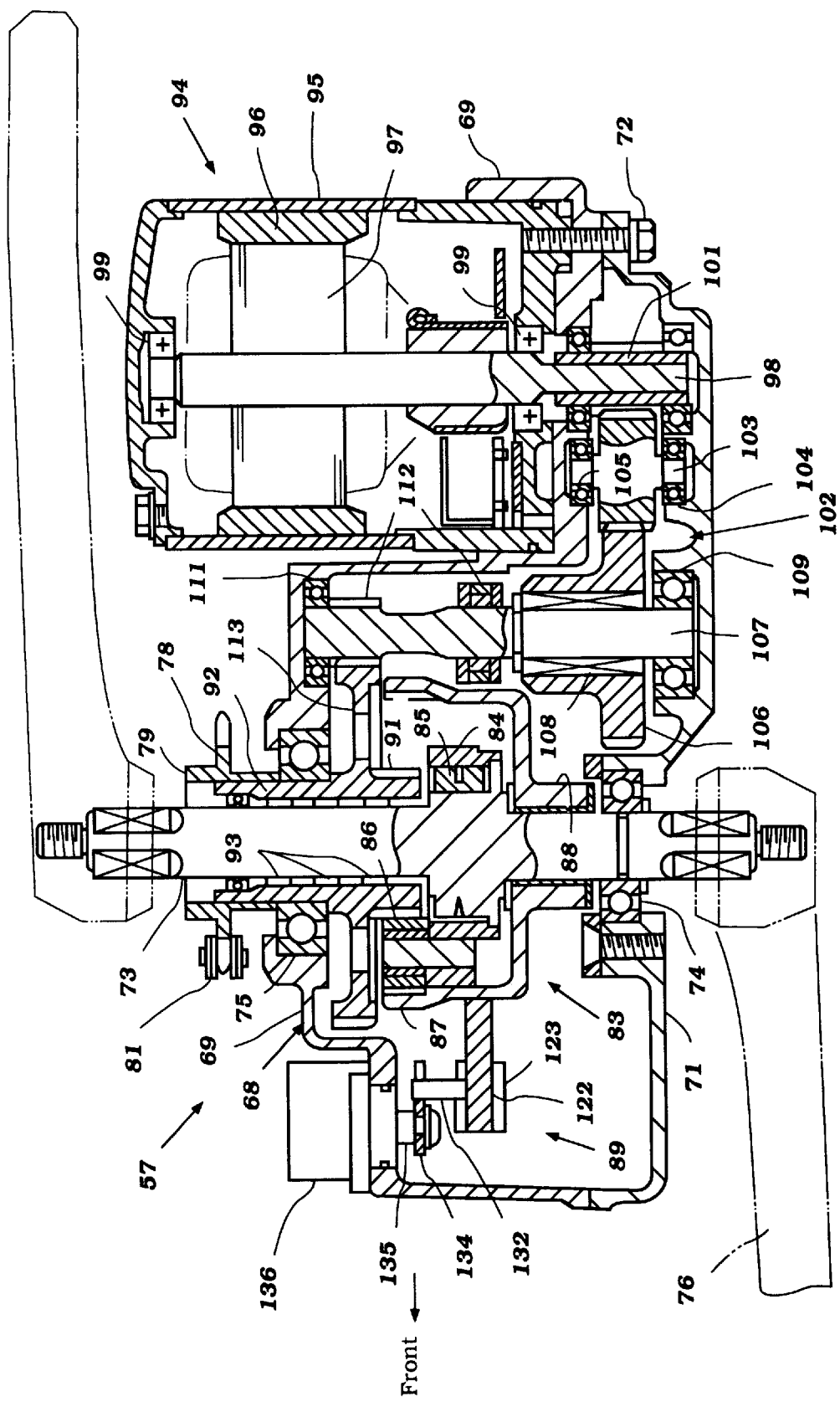
FIG. 3 is a cross-sectional view taken along a horizontally extending plane and showing the pedal operated and power assist drive unit for this bicycle.
Figure 4:
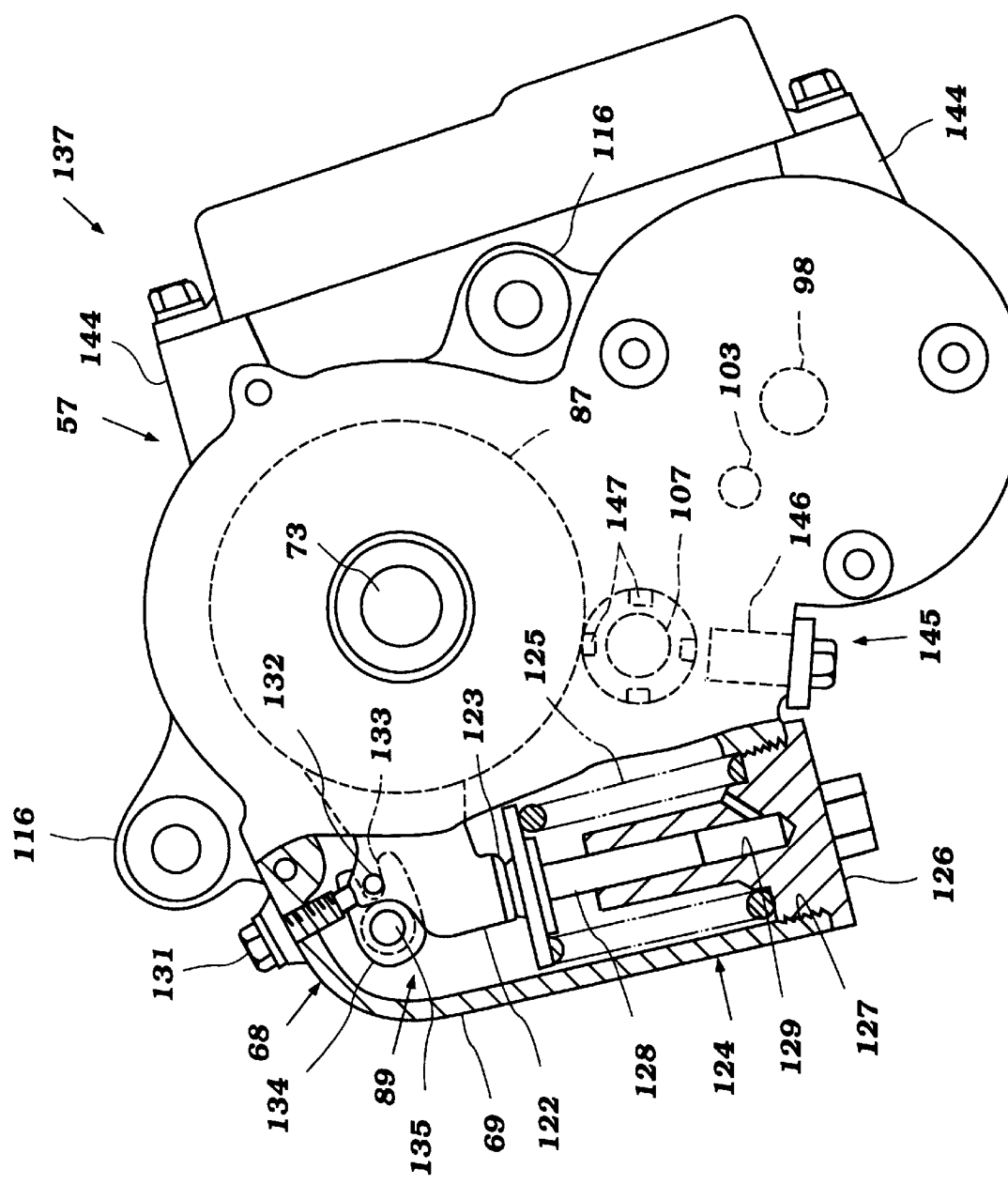
FIG. 4 is a side elevational view, with a portion broken away, looking in the same direction as FIG. 2 and showing only the drive unit.

A speed signal is also provided to the control unit 137 by a speed sensor which appears in FIGS. 3 and 4 and which is identified generally by the reference numeral 145. This speed sensor includes a sensor winding 146 that extends through an opening in the main housing assembly 69 which extends in a circumferential direction relative to the axis of rotation of the crankshaft 73. This opening is in close proximity to the transmission shaft 107.

The transmission shaft 107 carries a plurality of spaced permanent magnets 147. As each of these magnets 147 passes the winding 146 a pulse signal will be sent out and by counting these pulse signals in time the controller 137 can measure the actual speed of the bicycle 21. It should be noted that the shaft 107 rotates at the same speed as the sprocket 78 and driven rear wheel 61.

EMBODIMENT OF FIGS. 8 THROUGH 14

These figures show a second embodiment of the invention. Except for the mounting bracket assembly, the battery location and drive unit the basic bicycle, indicated by the reference numeral 151, is the same as that previously described. For that reason, components of this embodiment which are the same or substantially the same as the +previously described embodiment have been identified by the same reference numerals and will not be described again, except insofar as is necessary to understand the construction and operation of this embodiment.

In this embodiment, the bicycle frame 52 is slightly different from the previously described embodiment in that the down tube 54 is directly affixed to the seat tube 55. A mounting bracket assembly, indicated generally by the reference numeral 152, is welded or otherwise affixed to these frame members and carries the chain guards 58.

A power unit, indicated generally by the reference numeral 153, is mounted on the underside of the bracket 152 in a manner which will be described. This power unit 153 includes a drive unit 154 which has a construction as will be described. In addition and if desired, a small cover assembly 155 may be mounted on the frame assembly 52 to cover a major portion of the power unit 153.

Figure 8:
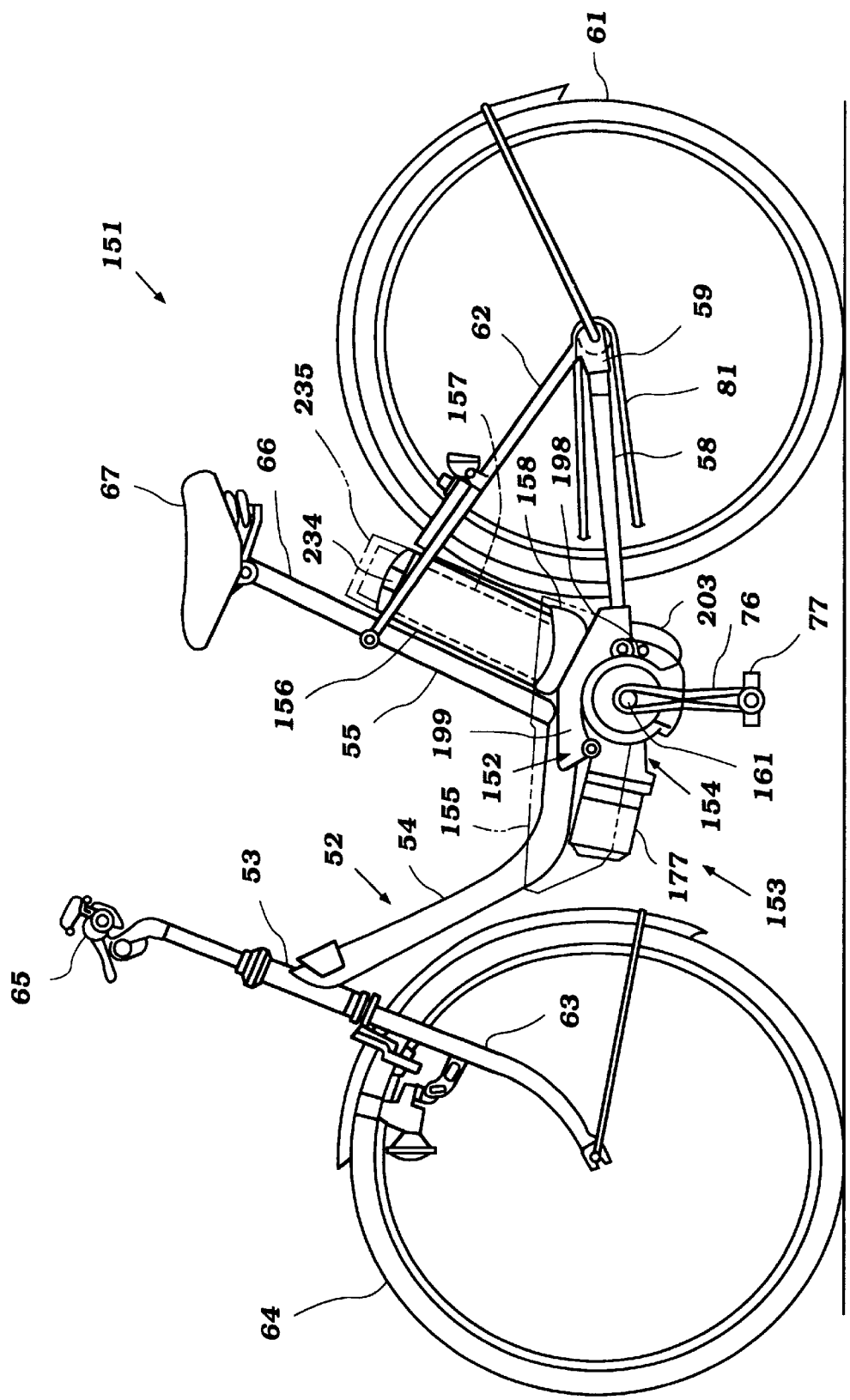
FIG. 8 is a side elevational view, in part similar to FIG. 2, and shows another embodiment of the invention.

As may be seen in FIG. 8, a battery box 150 is positioned to the rear end of the seat pipe 55 and between the back stay 62. This permits a rechargeable battery 160 to be inserted or removed from the battery box 150 in a vertical direction. The battery box 156 has a base portion 158 which, as will be described, affords the electrical connection between the battery 160 and the drive unit 154. This interrelationship will be described later.

Figure 11:
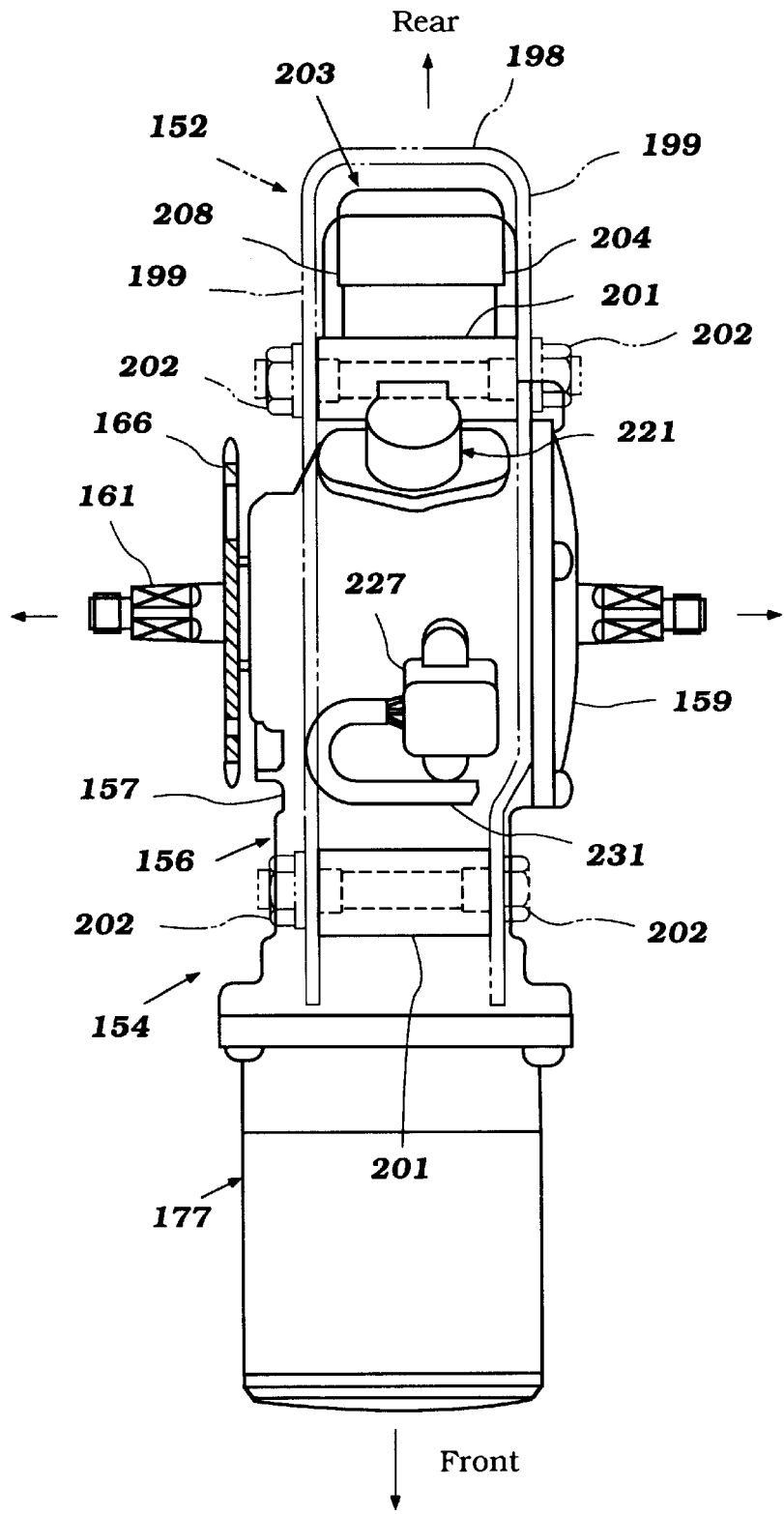
FIG. 11 is a top plan view of the construction shown in FIG. 10.
Figure 12:
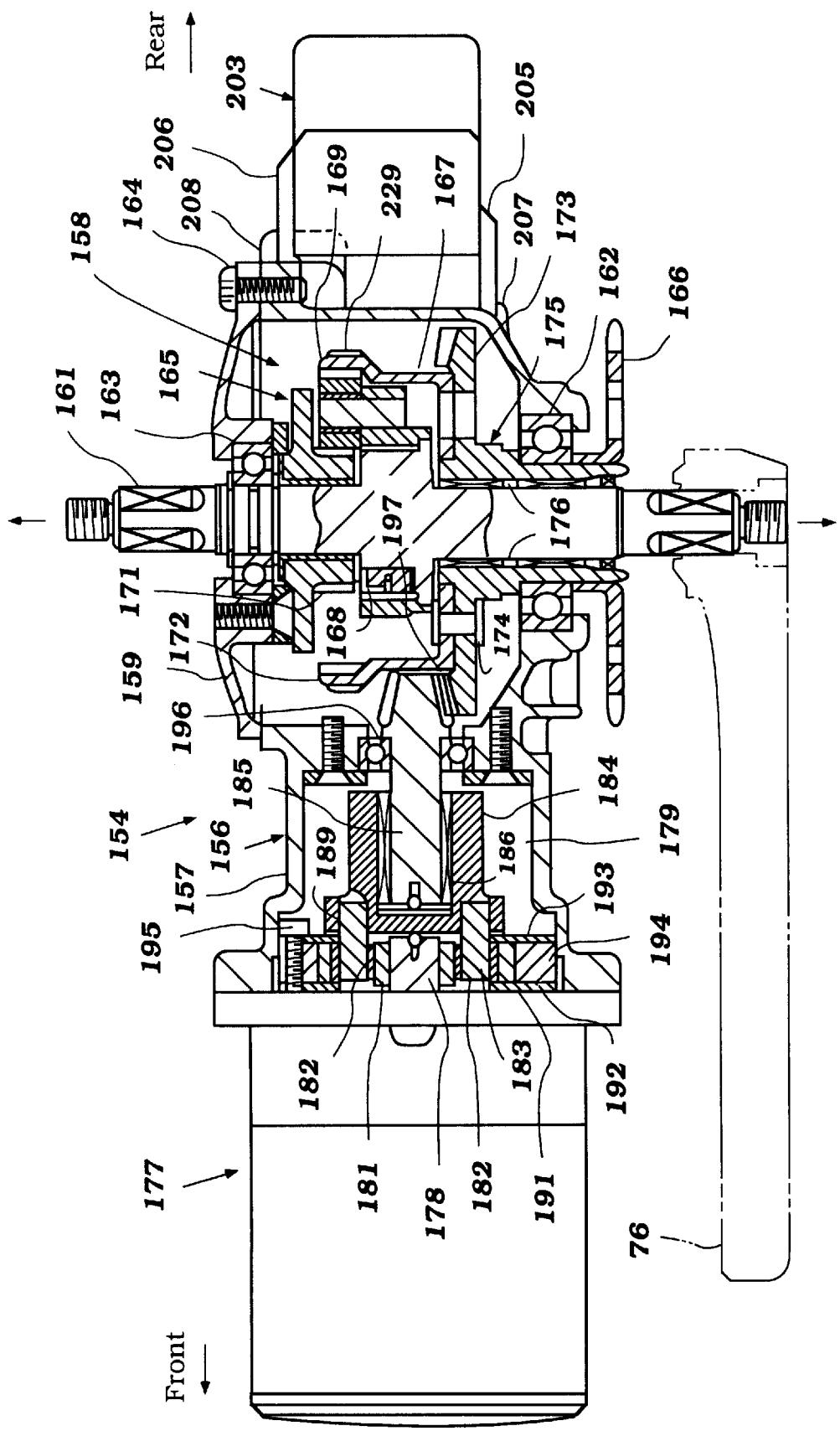
FIG. 12 is a bottom plan view of the structure shown in FIG. 11, but with a portion broken away so as to more clearly show the mechanism.
Figure 13:
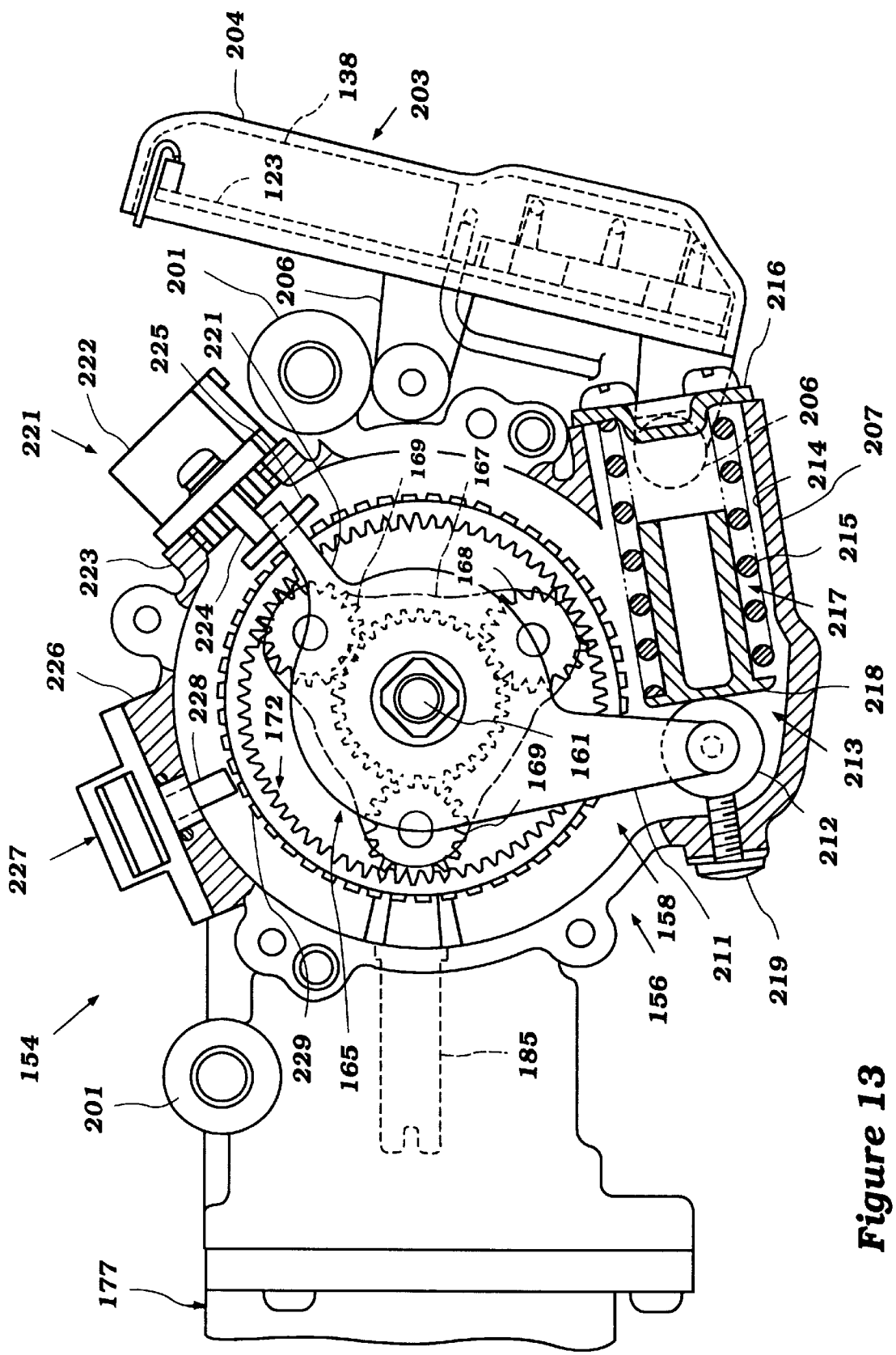
FIG. 13 is an enlarged view looking in the same direction as FIG. 10 with the cover plate removed and a portion broken away so as to show the internal construction.

Referring now primarily to FIGS. 9–14, and initially primarily to FIGS. 12 and 13, the drive unit 154 includes an outer housing, indicated generally by the reference numeral 156. This housing includes a main housing piece 157 that defines an internal cavity 158 and which is closed by a cover plate 159.

A crankshaft 161 is rotatably journaled within the housing 156 by a first bearing 162, that is carried by the main housing member 157, and a second bearing 163, that is carried by the cover plate 159. The cover plate 159 is connected to the main housing piece 157 by threaded fasteners 164.

A first planetary type transmission, indicated generally by the reference numeral 165, is positioned within the cavity 158 and provides a step-up ratio between the crankshaft 161 and a driving sprocket 166. The sprocket 166 drives the rear wheel 61 through a chain 81 in the manner previously described.

The first planetary transmission 165 includes a planet carrier 167 that is connected to the crankshaft 161 for driving thereby via a one-way clutch 168 for the purpose already described. The planet carrier 167 carries a plurality of planet gears 169 which are enmeshed with a sun gear 171 that is mounted for limitation rotation on the crankshaft 165 for cooperation with the torque-sensing device shown in FIGS. 13 and 14, and which will be described in more detail later.

Finally, the planet gears 169 are engaged with a ring gear 172. The ring gear 172 is connected to a further ring gear 173 by fasteners 174. The further ring gear 173 is formed with an integral tubular hub portion 175 to which the sprocket 166 is connected by a splined connection or the like. This tubular hub portion 175 is journaled on the crankshaft 161 by anti-friction bearings 176. The tubular hub portion 175 is directly journaled in the main housing member 157 by the bearings 162 so as to complete the journaling of the crankshaft 161 in the manner of the previously described embodiment.

The crank arms 76 and pedals 77 are affixed to the exposed ends of the crankshaft 161 for manual pedaling of the bicycle 151.

In this embodiment, an electric assist motor, indicated generally by the reference numeral 177, is mounted so that its drive shaft 178 rotates about a longitudinally extending axis which axis intersects the axis of rotation of the crankshaft 161. Also in this embodiment, a planetary transmission 179 is coupled to the electric motor drive shaft 178 for driving the ring gear 173 and sprocket 166 at a reduced speed ratio. This planetary transmission 179 is of the frictional type as disclosed in aforenoted U.S. Pat. No. 5,570, 752, the disclosure of which is incorporated herein by reference.

Basically, this is a frictional planetary transmission that includes an input sun gear 181 that is fixed for rotation with the motor drive shaft 178. This sun gear is frictionally engaged with planet gears 182 that are journaled on carrier pins 183. The carrier pins 183 are carried by a planet carrier 184 which is, in turn, connected to a pinion shaft 185 via a one-way clutch 186. The one-way clutch is employed for the reasons aforedescribed.

Finally, the planet gears 182 are frictionally engaged with a ring gear 191. The ring gear 191 is contained between a pair of plates 192 and 193 separated by a spacer member 194. This assemblage is held in place by threaded fasteners 195 so as to maintain the positioning of the elements as described in the aforenoted United States Letters patent.

The pinion shaft 185 driven through the planetary transmission 179 is journaled by an anti-friction bearing 196. A pinion gear 197 is formed on the end of the shaft and it engages the further ring gear 173 for driving the sprocket 166 in the manner already described.

In this embodiment, the supporting bracket 152 also has a C-shape, but actually the shape is more likely an inverted U in that the member 152 has an upper wall portion 198 and a pair of depending side wall portions 199 which lie on opposite sides of the drive unit 154. The drive unit outer housing 156 is formed with a pair of lugs 201. These lugs 201 pass threaded fasteners 202 that secure the drive unit 154 and specifically its outer housing 156 to the depending sides 199 of the bracket 152.

In this embodiment like the previously described embodiment, a control unit 203 is mounted directly on the drive unit outer casing 156. The control unit 203 has an internal construction as of the type already described and includes a metallic outer cover plate 204 that is formed with a pair of tabs 205 and 206. The tab 205 is connected to a lug 207 formed on the lower part of the housing piece 156 and which serve an additional purpose which will be described. The tab 206 is connected to a further lug 208 of the housing member 156 by a threaded fastener 209. As previously noted this assists in heat transfer from the control unit 203.

The control strategy by which the control unit 203 operates may be of the type already described. Therefore, the propulsion unit 153 is provided with both a torque sensor, shown in most detail in FIGS. 13 and 14, and a speed sensor, shown in most detail in FIG. 13.

Referring first to the torque sensor, it includes the torque reaction member 165, which, as has been previously noted, is journaled for slight rotation or movement relative to the crankshaft 161 and which is formed integrally with the sun gear 171. This torque reaction member 165 has a first arm portion 211 which carries a roller 212 at its outer extremity. This roller 212 is acted on by a biasing spring assembly, indicated generally by the reference numeral 213, which is contained within the housing lug 207 and specifically within a cylindrical recess portion 214 thereof.

Figure 1:
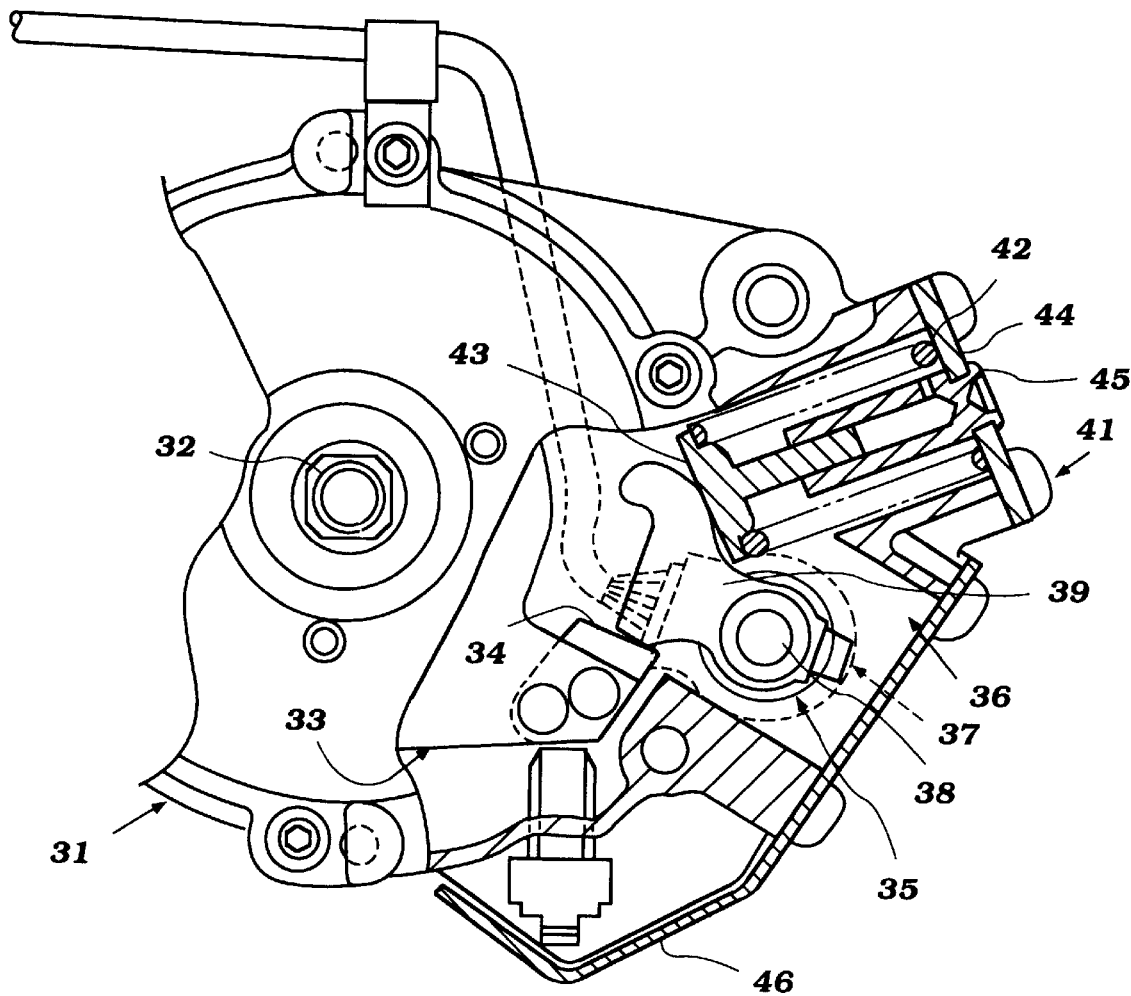
FIG. 1 is a side elevational view of a prior art type of pedal operated electric power assisted mechanism for a vehicle such as a bicycle with a portion broken away so as to show the torque sensor.

The spring assembly includes a coil compression spring 215 that bears against an end plate 216 that is affixed across the open end of the cylindrical opening 214. The other end of the spring 215 engages a sliding plunger 217 that has an end portion 218 which is engaged with the roller 212. Because of the use of the roller contact, friction losses are avoided and the hysteresis effect with the prior type of torque sensors, for an example that of the previous embodiment and that shown in the prior art construction of FIG. 1, is avoided.

An adjustable stop 219 is supported in the housing member 156 and limits the at rest position of the torque-sensing arm 165.

Spaced from the arm 211 is a second arm 221 that is juxtaposed toward the upper part of the housing assembly 156 and specifically adjacent a potentiometer, indicated generally by the reference numeral 222. The potentiometer 221 has a sensor unit mounted in a housing 222 that is supported on a lug 223 formed on the upper rear portion of the housing 156. This permits the potentiometer shaft 224 to extend into the housing cavity 158 in proximity to the torque sensing member 165.

Figure 14:
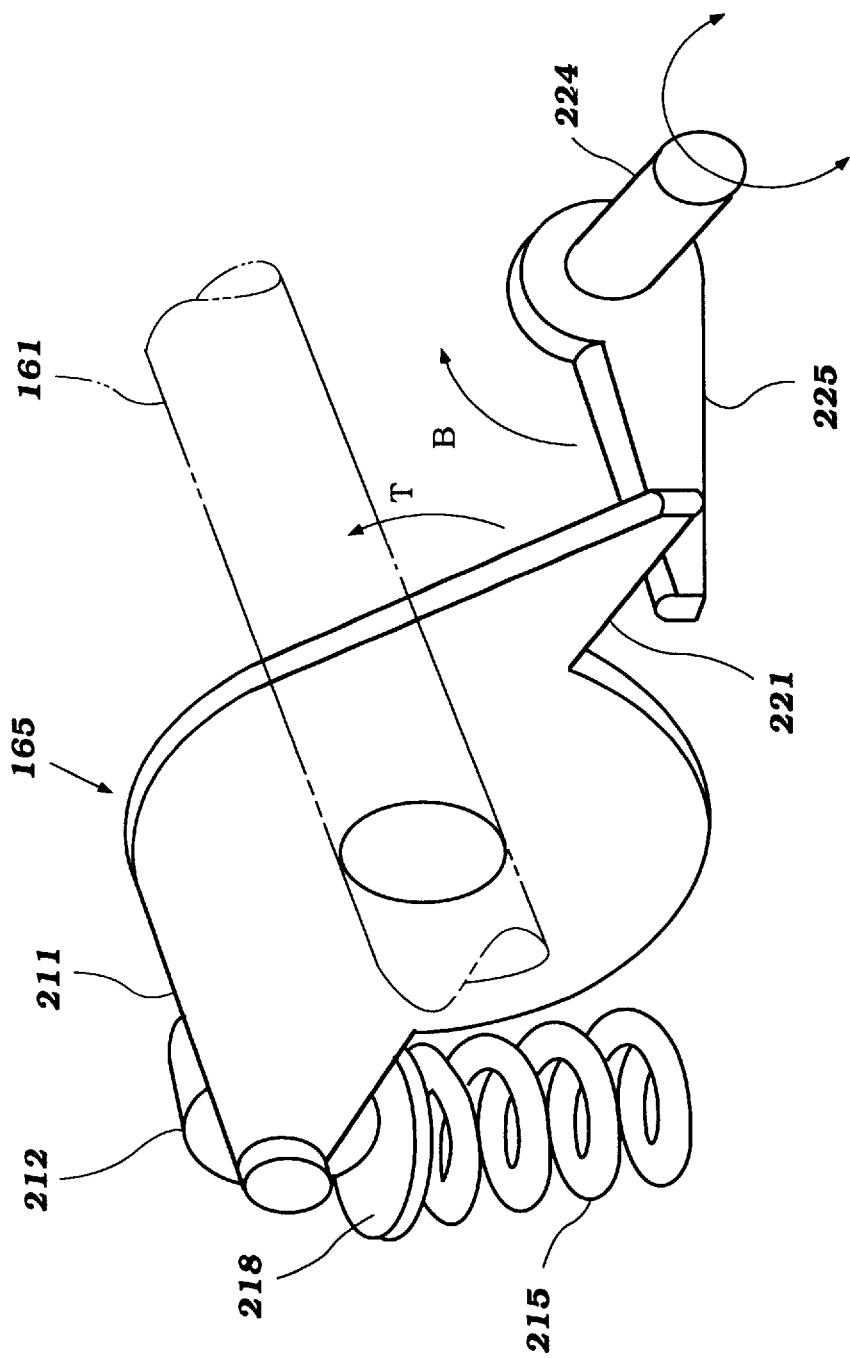
FIG. 14 is an enlarged perspective view showing the torque sensor of this embodiment.
Figure 15:
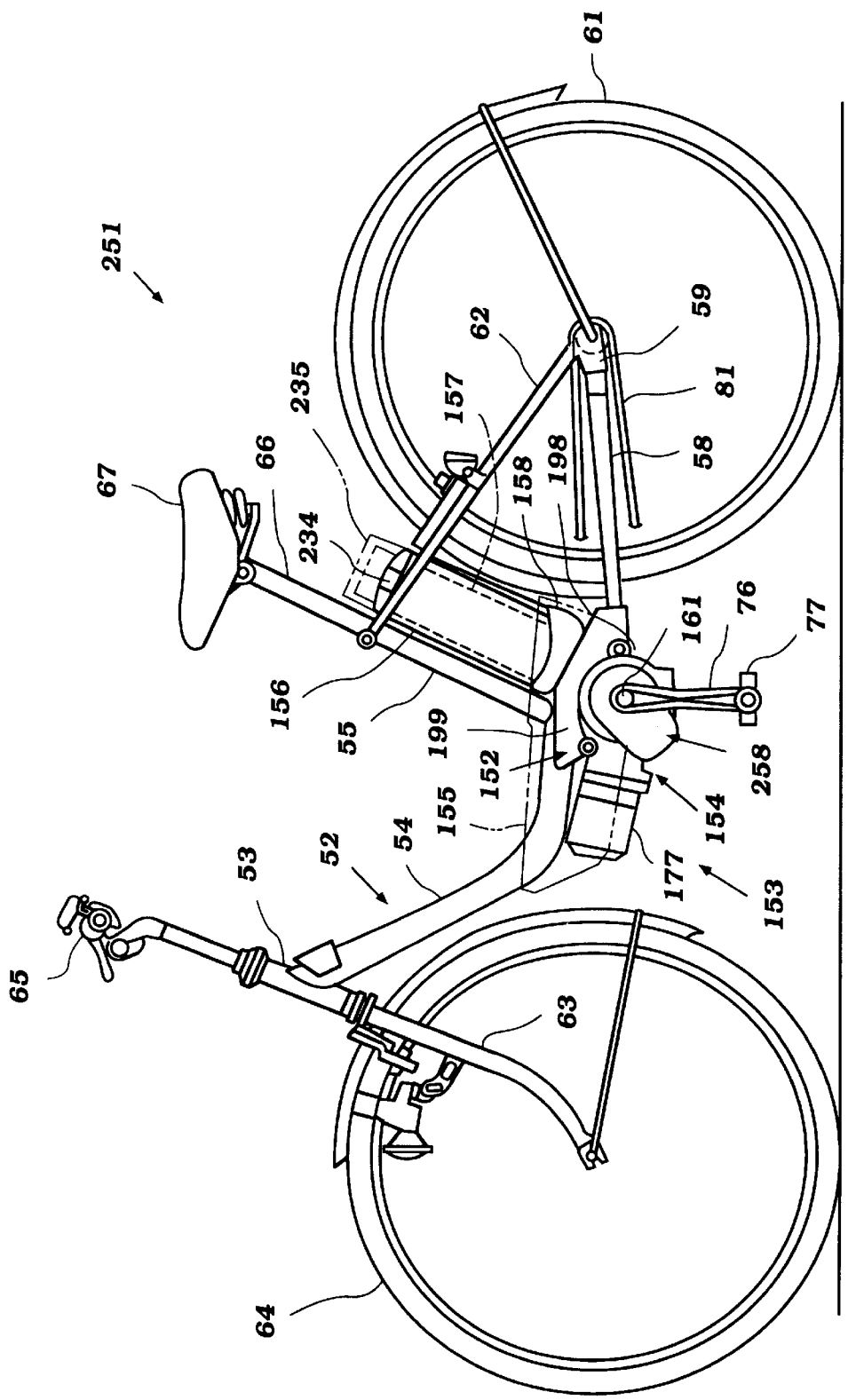
FIG. 15 is a side elevational view, in part similar to FIGS. 2 and 8 and shows a third embodiment of the invention.
Figure 16:
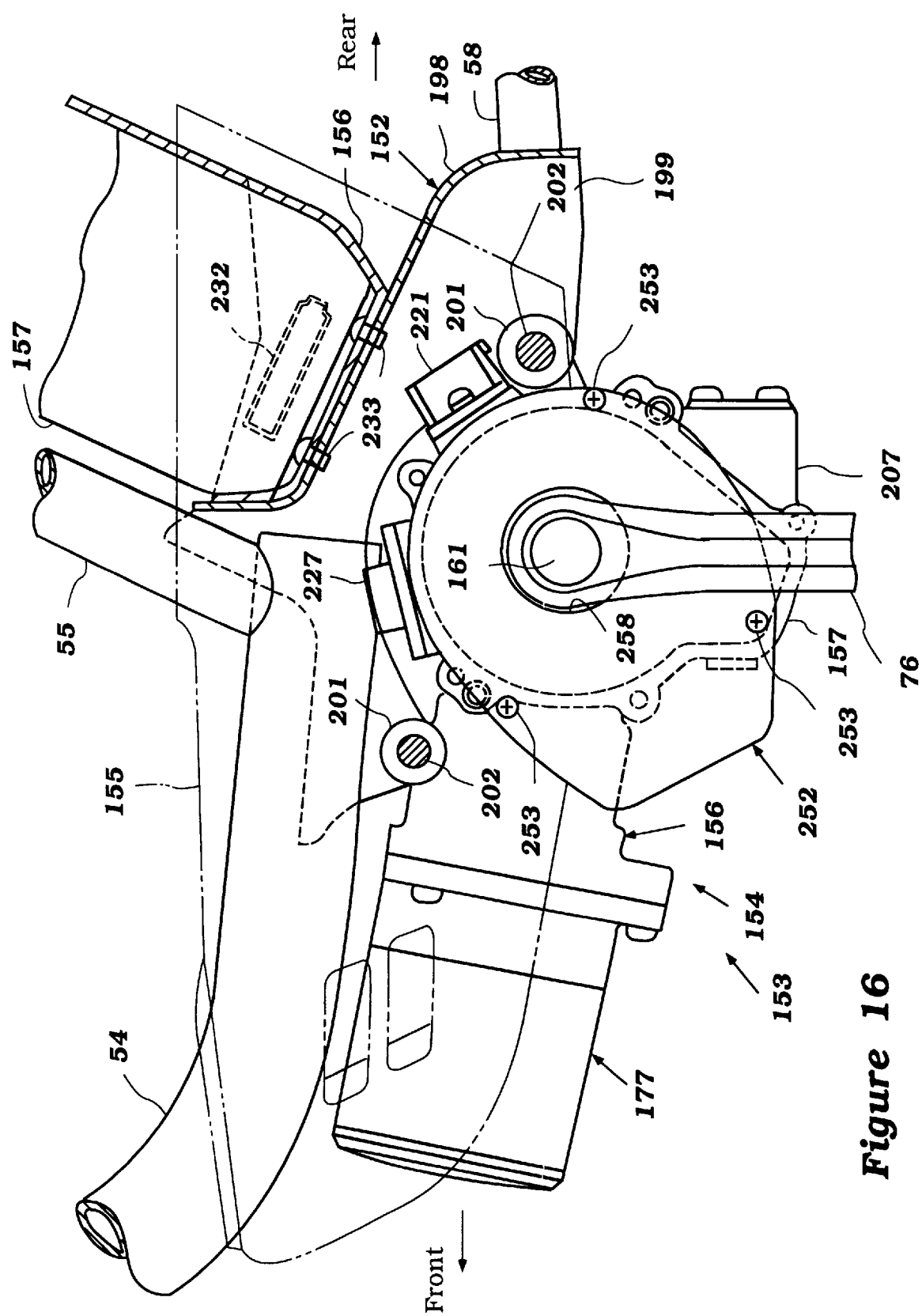
FIG. 16 is an enlarged side elevational view showing the power assist and manual drive unit of this embodiment and the associated juxtaposed components of the bicycle.
Figure 17:
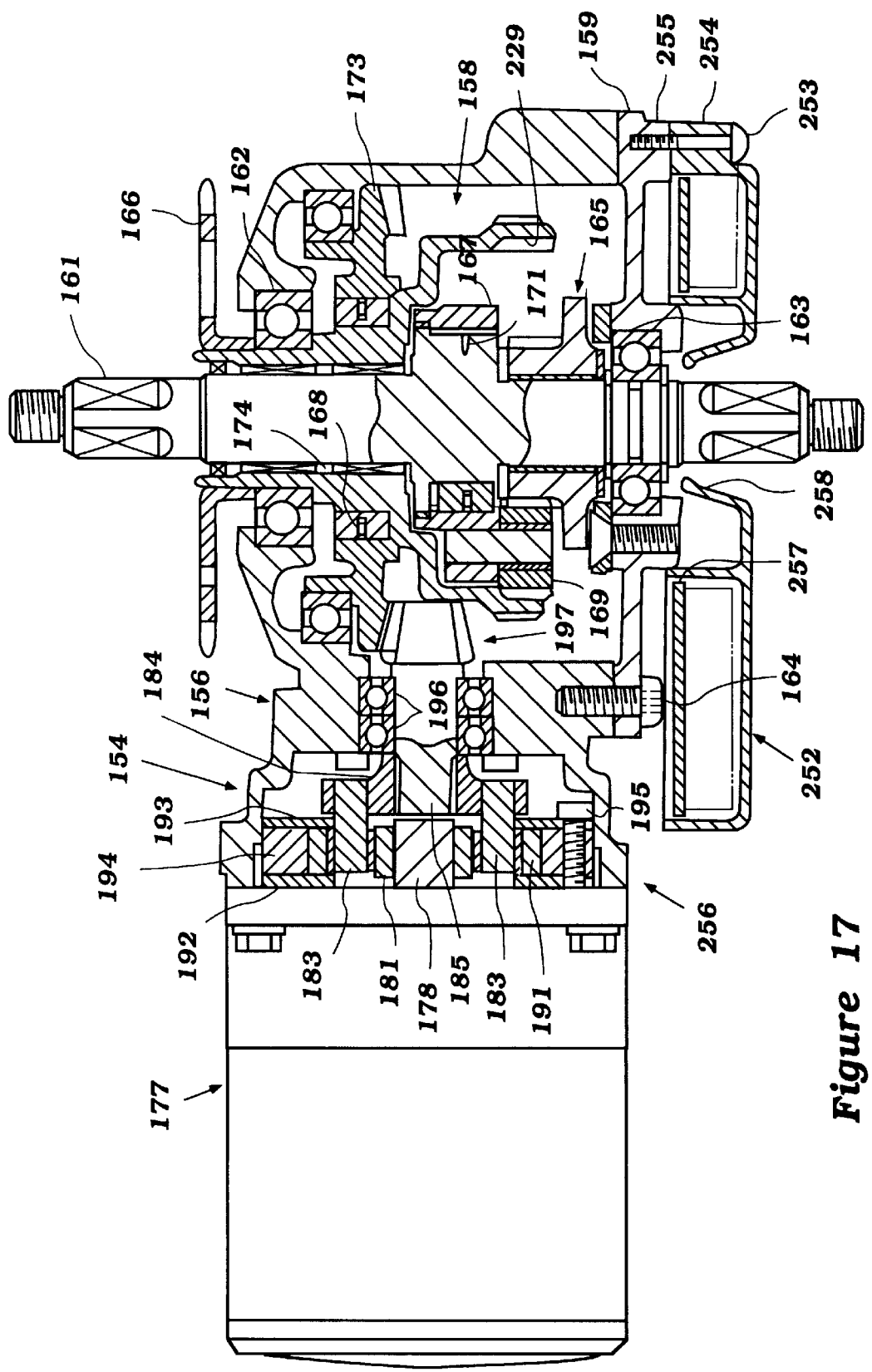
FIG. 17 is a top plan view of the drive unit of this embodiment with portions broken away and shown in cross section.
Figure 18:
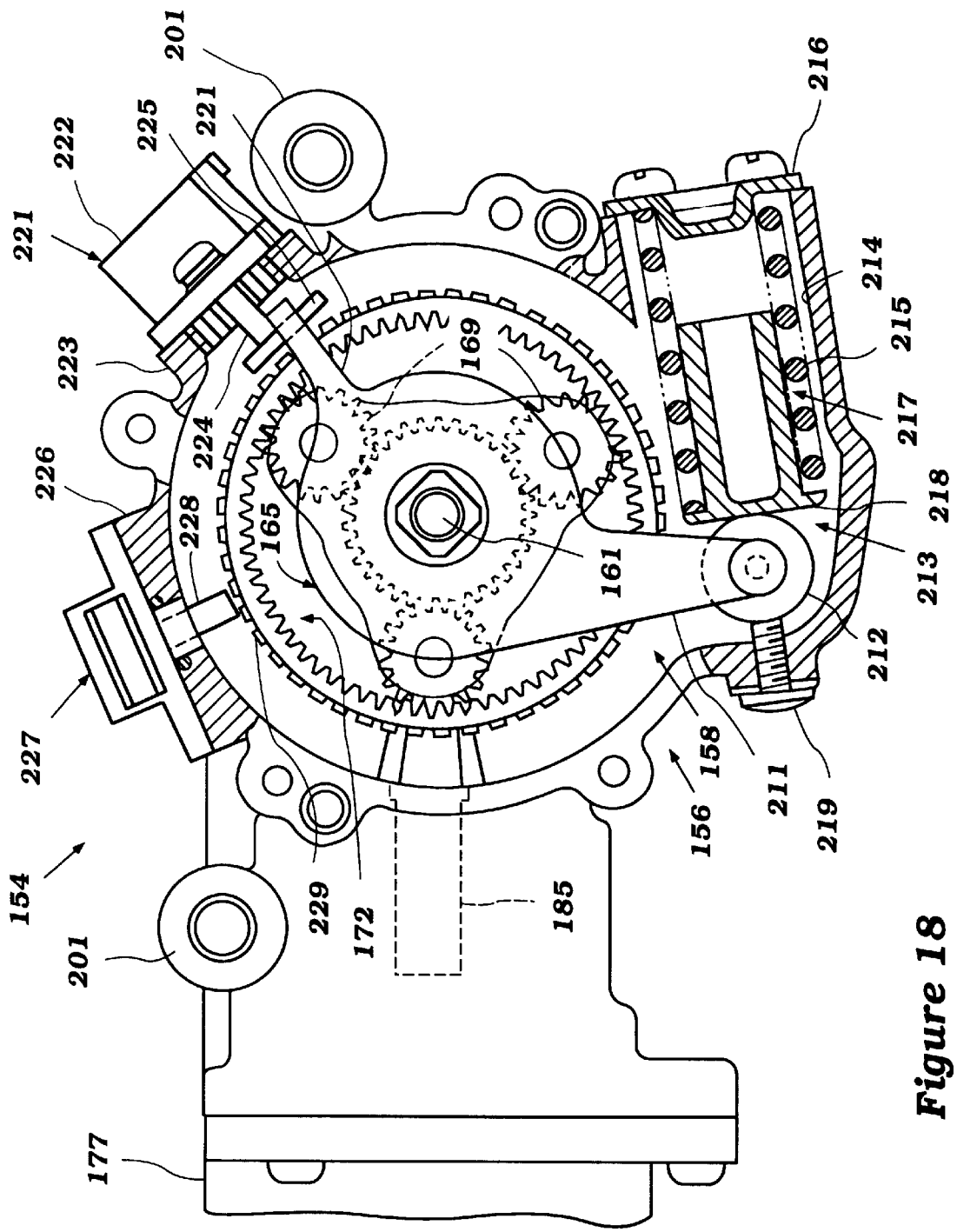
FIG. 18 is a side elevational view of the power unit looking in the same direction as FIG. 16 but with the cover plate removed and portions broken away so as to more clearly show the internal construction.

With this embodiment, the potentiometer shaft 224 is spring-biased in a direction indicated by the arrow B in FIG. 14. The potentiometer shaft 224 has a bell crank with a contact arm 225 affixed to it and which is engaged with a shoulder formed on the arm portion 240 of the torque sensing member 165. As a result, when a torque is exerted on the torque sensing member 165 so that it rotates in the direction indicated by the arrow T in FIG. 14, the arm 225 and potentiometer shaft 224 will rotate and follow this movement. This outputs a signal indicative of angular position that is transmitted to the control unit 203 by a short connector.

The outer housing 156 is also formed with a further lug 226 on its upper surface to which is affixed a speed sensor 227. The speed sensor 227 is also of the magnetic inductive type but is of a slightly different form. In this embodiment, there is provided an armature around which a winding is disposed. The sensor 227 has a sensing tip 228 that extends through a further hole formed in the outer housing 156 and which is in proximity to a plurality of sensor lugs or teeth 229 formed on the outer periphery of the ring gear 172. Each time a tooth 229 passes the sensor probe 228, a pulse will be experienced that can be counted by a counter in the control unit 203 so as to provide a speed indication for the control. FIG. 11 shows a conductor 231 that can be utilized for transmission of this energy.

In this embodiment, the housing assembly is such that the two sensors 221 and 227 are positioned beneath the cover plate 152 and specifically its top surface 198 so as to be well-protected. Again, however, air can cool these sensors. Like the previous embodiment, this construction also permits location of the sensors in close proximity to the control 203 so as to minimize the length of external wiring and the likelihood of damage.

Figure 9:
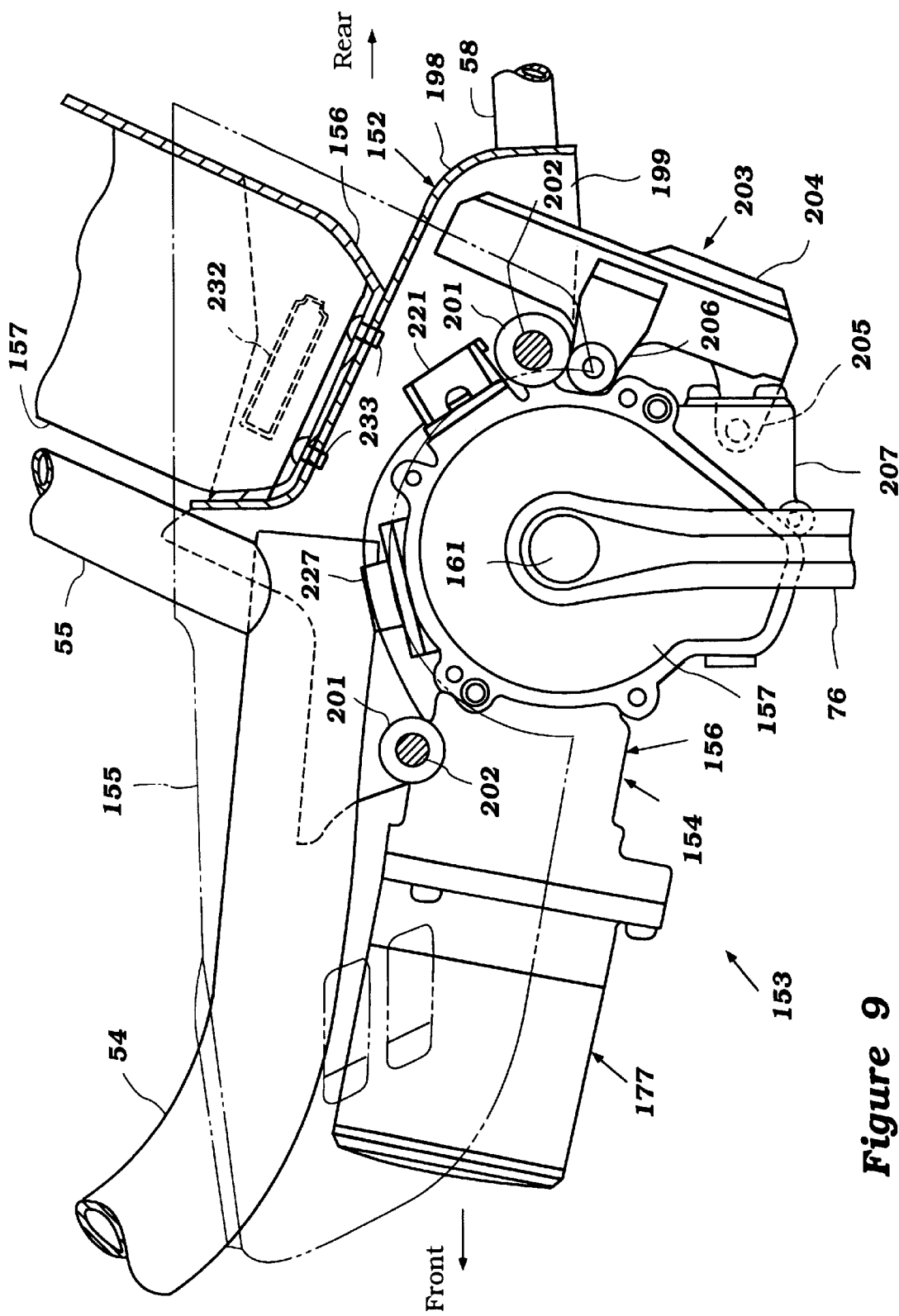
FIG. 9 is an enlarged side elevational view showing the power assist and pedal drive unit of this embodiment and the associated juxtaposed components of the bicycle.
Figure 10:
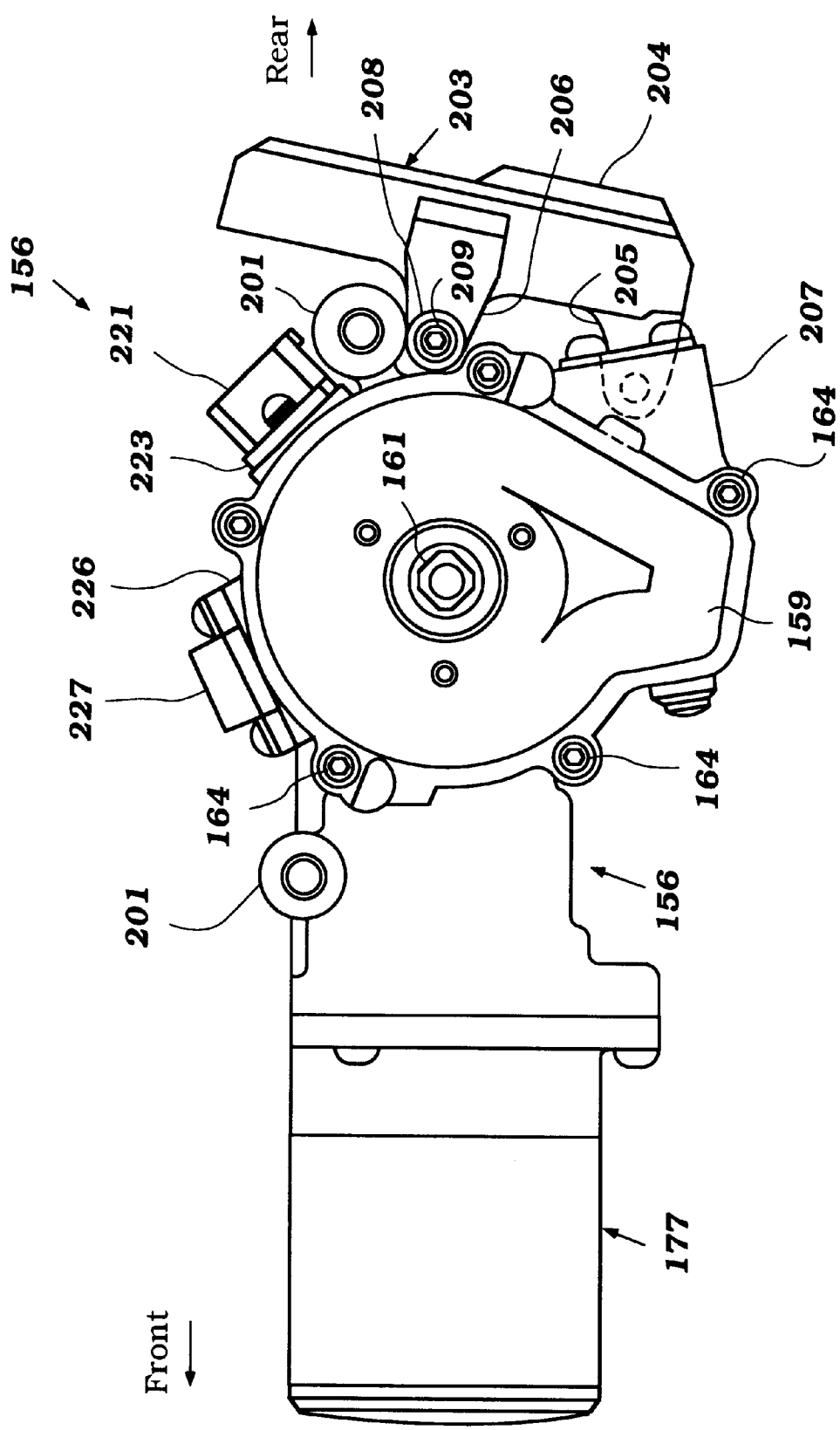
FIG. 10 is a side elevational view showing only the drive unit with the crank arms removed.

The construction of the battery case 150, battery 160 and their relation to the controls will now be described by particular reference to FIGS. 8 and 9. As may be seen in FIGS. 8 and 9, the positioning of the battery case 156 to the rear of the seat tube 55 permits it to be located quite close to the sensors 221 and 227 as well as the control 203.

The battery 160 has a terminal 232 at its lower end and this contacts a terminal in the battery case 150 which is not shown, which establishes an external electrical connection when the battery 160 is installed in the battery case 150. The battery case 150 is fixed to the bracket 152 by threaded fasteners 233. Thus, it will be seen that there is only a very short electrical path between the battery 160, the motor 177 and the various controls and sensors. This further improves the reliability of the system.

The battery case 150 has a cover that receives a terminal or charging connector 234. In addition, a folding handle 235 is provided on the battery 160 so as to permit its removal for charging at a remote source if desired.

EMBODIMENT OF FIGS. 15–21

In all of the embodiments as thus far described, the sensors for the control have been mounted on the circumferential outer surface of the drive unit outer housing. The term "circumferential outer surface" as used herein means the surface that extends around the axis of the crankshaft. In addition, in the embodiments thus far disclosed, the control unit has also been mounted on this circumferential outer surface. It is possible, however, within the invention, to also mount the control unit so that it is on one of the outer surfaces of the outer housing that extends perpendicularly to the axis of rotation of the crankshaft. This type of outer surface is called an "end outer surface" and the embodiment of FIGS. 15–21 shows such an embodiment.

Except for this difference, this embodiment is the same as that of FIGS. 8–14. Thus, the basic construction of the bicycle of this embodiment, which is indicated generally by the reference numeral 251, and the drive unit are the same as the embodiment of FIGS. 8–15 and these components have been identified by the same reference numerals and will be described again only insofar as is necessary to understand the construction and operation of this embodiment.

In this embodiment, a control unit assembly, indicated generally by the reference numeral 252, is mounted on the end face of the outer housing assembly 156 which is adjacent to the closure plate 159. This mounting is accomplished by means of threaded fasteners 253 that pass through openings in the metallic outer housing 254 of the control unit 252. This outer housing 254 is, like the previously described embodiments formed from a metal that is highly heat-conductive such as aluminum or an aluminum alloy. The cover plate 159 is formed with bosses 255 so as to afford an air space and permit rapid heat dissipation for cooling of the control unit 252 without adversely affecting heat transfer.

The control unit 252, like those previously described, consists of a base plate or substrate 256. In this embodiment, however, the base 256 plate is formed with a circular aperture 250 and the outer housing 254 is also formed with a central aperture or opening 260. This facilitates passage of the crankshaft 161 therethrough.

Figure 21:
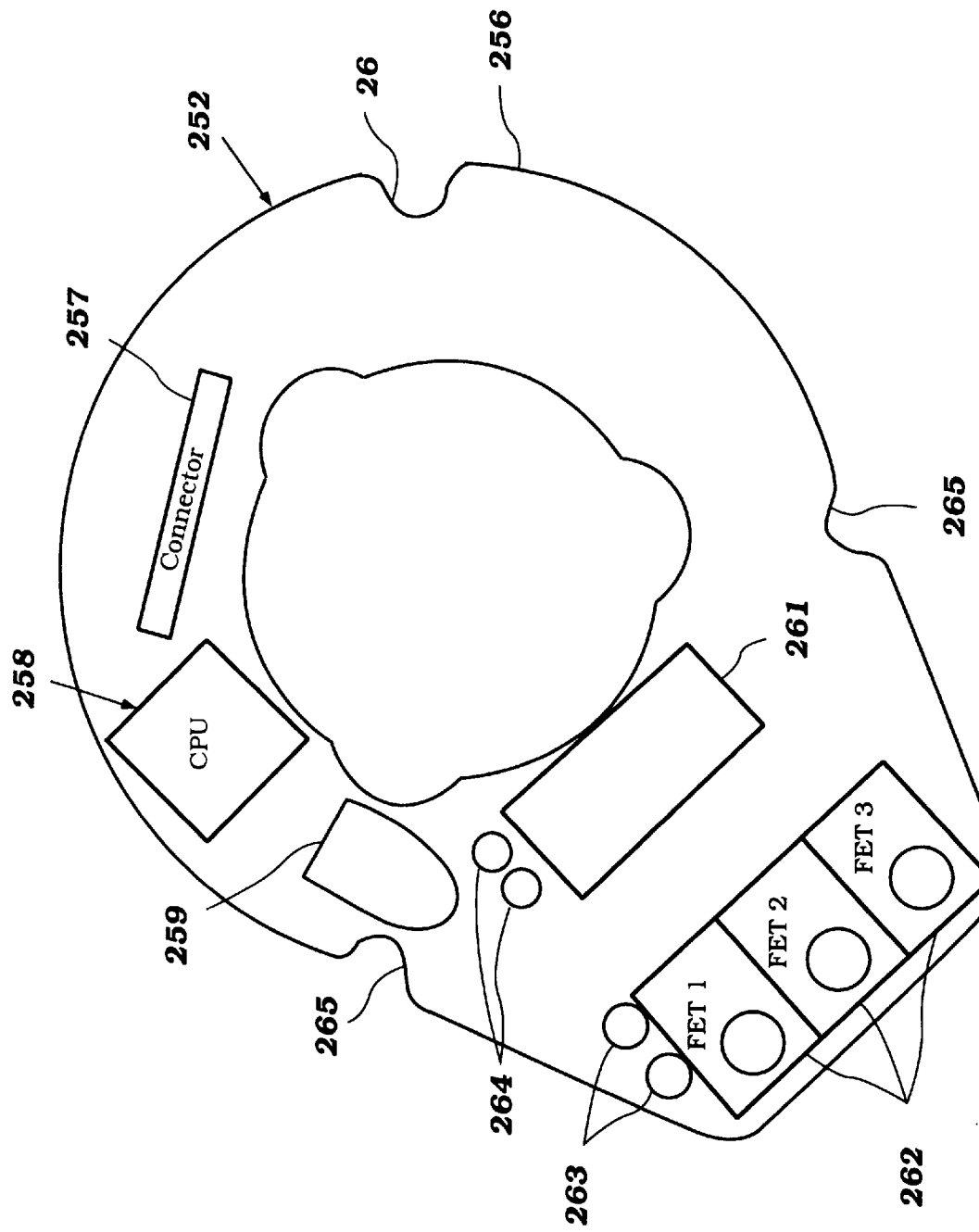
FIG. 21 is a side elevational view showing the control unit of this embodiment with the cover and potting material removed.

As may be best seen in FIG. 21, the various electrical components of the control unit 252 mounted on the substrate 256 are shown. These components include, among other things, a connector 257 to which the leads from the various sensors and control switches are coupled by a wire harness or the like.

Also mounted on the substrate 256 is a CPU indicated generally by the reference numeral 258. Various solid state components can be mounted such as a shunt resistor 259 and capacitor 261. Additionally, FET's (field effect transistors), FET1, FET2 and FET3, indicated collectively by the reference numerals 262, may be mounted on the substrate 256.

A pair of power cable connections, indicated by the reference numerals 263 and 264, respectively, are also mounted on the substrate 256 for connections to the electric motor 177 and battery 160, respectively.

Like the previously described embodiments, these mounted components are sealed within a potting compound.

Suitable recesses 265 are formed around the periphery of the substrate 256 and its outer housing 254 so as to clear the threaded fasteners 253 that attach the cover plate 156 of the outer housing assembly 154 to the main housing member 157. Thus, it will be possible to remove the cover 159 along with the attached control unit 252.

Figure 19:
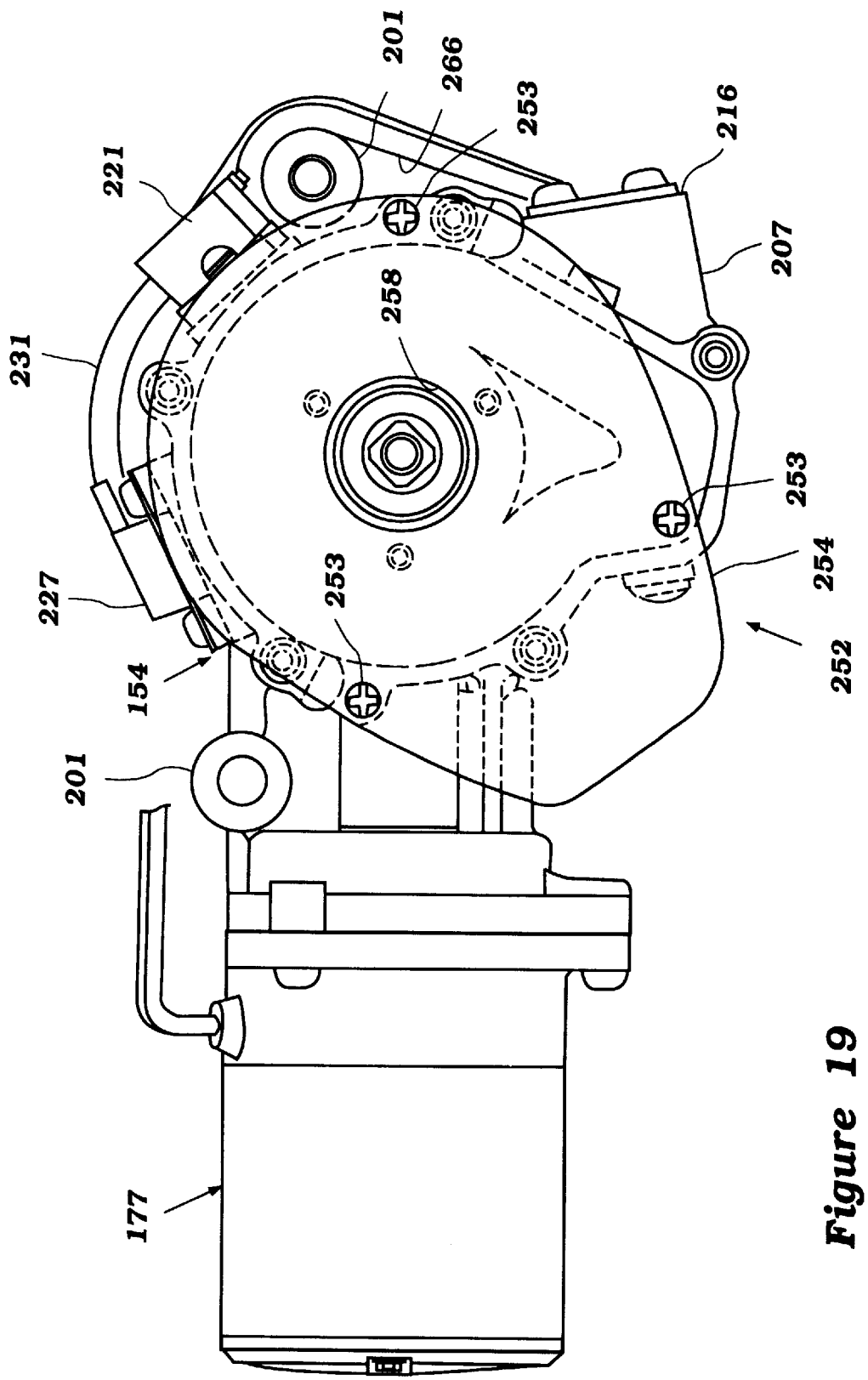
FIG. 19 is a side elevational view looking in the same direction as FIG. 16 but showing only the drive unit.
Figure 20:
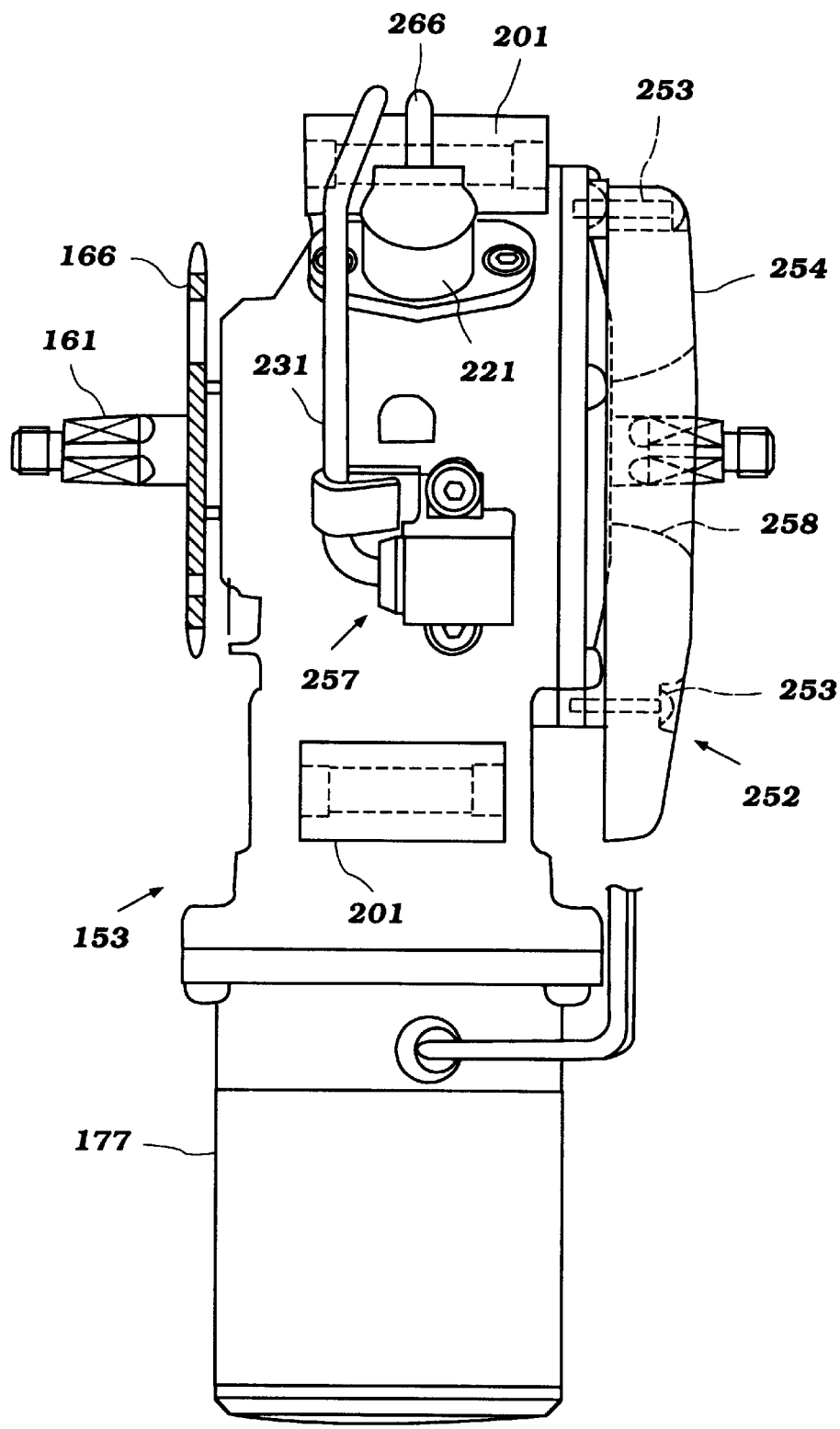
FIG. 20 is a top plan view of the drive unit.

The conductor for transmitting the torque signal form the torque sensor appears in FIGS. 19 and 20 and is identified by the reference numeral 266 Thus, from the described construction, it should be readily apparent that the various embodiments illustrated and described are very effective in providing not only a compact power unit which can be utilized with the vehicles of the type illustrated, but also with other vehicles, wherein the amount of external wiring of the unit is substantially minimized and wherein all of the components are well-protected.

Of course, it would be readily apparent to those skilled in the art that the embodiments described are merely typical of a preferred embodiments of the invention. Various changes and modifications may be made without departing from the spirit and scope of the invention, as defined by the appended claims.

We claim:

1. An electric motor assisted and manual power operated drive assembly for a vehicle and control said assembly comprising an outer housing for journaling a crankshaft for rotation about a crankshaft axis, said crankshaft having opposite ends protruding from said outer housing and adapted to receive crank arms and pedals for application of manual power to said crankshaft, an electric motor having a drive shaft and supported by said outer housing, an output shaft journaled within said outer housing for driving the associated vehicle, a transmission contained within said outer housing for driving said output shaft from said crankshaft and said electric motor drive shaft, and a controller for controlling the operation of said electric motor mounted directly on a side surface of said outer housing, said controller being formed with a central opening through which one end of the crankshaft passes.

2. An electric motor assisted and manual power operated drive assembly for a vehicle and control therefor as set forth in claim 1, further including at least one sensor having a signal sending portion mounted directly on the exterior of said outer housing and having a sensing portion extending into the interior of said outer housing and cooperating with a member contained therein for actuating said signal sensing portion to provide an operational control signal to said controller.

3. An electric motor assisted and manual power operated drive assembly and control therefor as set forth in claim 2, wherein the at least one sensor senses a condition of said drive assembly.

4. An electric motor assisted and manual power operated drive assembly and control therefor as set forth in claim 3, wherein the at least one sensor senses the manual torque applied to the crankshaft.

5. An electric motor assisted and manual power operated drive assembly and control therefor as set forth in claim 4, wherein the torque sensor signal sending portion comprises a potentiometer.

6. An electric motor assisted and manual power operated drive assembly and control therefor as set forth in claim 5, wherein the potentiometer sensing portion includes a shaft extending into the outer housing.

7. An electric motor assisted and manual power operated drive assembly and control therefor as set forth in claim 6, wherein the potentiometer shaft extends perpendicularly to the axis of the crankshaft.

8. An electric motor assisted and manual power operated drive assembly and control therefor as set forth in claim 7, wherein the potentiometer shaft is operated by a bell crank.

9. An electric motor assisted and manual power operated drive assembly and control therefor as set forth in claim 3, wherein the at least one sensor is a speed sensor.

10. An electric motor assisted and manual power operated drive assembly and control therefor as set forth in claim 9, wherein the speed sensor is positioned on the circumferential outer surface of the outer housing.

11. An electric motor assisted and manual power operated drive assembly and control therefor as set forth in claim 10, wherein the speed sensor sensing portion cooperates with a component of the transmission for providing the speed signal.

12. An electric motor assisted and manual power operated drive assembly and control therefor as set forth in claim 2, wherein the control is mounted in heat exchanging relationship to the outer housing for dissipating heat to the atmosphere from the outer housing.

13. An electric motor assisted and manual power operated drive assembly and control therefor as set forth in claim 1, wherein the assembly and controller are mounted as a unit on a C-shaped bracket.

14. An electric motor assisted and manual power operated drive assembly and control therefor as set forth in claim 13, wherein the C-shaped bracket has opposite sides that are engaged with and directly connected to the outer housing and wherein the bracket defines an air space around the outer housing for the passage of cooling air thereacross.

15. An electric motor assisted and manual power operated drive assembly and control therefor as set forth in claim 1, wherein at least a portion of the transmission comprises a planetary transmission and a torque sensor cooperates with member of the planetary transmission that is permitted to rotate only slightly and the torque sensor senses the degree of rotation of said planetary transmission member.

16. An electric motor assisted and manual power operated drive assembly and control therefor as set forth in claim 1, wherein in combination with the vehicle and wherein the vehicle is provided with a battery carrier disposed in close proximity to the drive assembly and controller.

17. A combination as set forth in claim 16, wherein the assembly and controller are mounted as a unit on a C-shaped bracket.

18. A combination as set forth in claim 17, wherein the C-shaped bracket has opposite sides that are engaged with and directly connected to the outer housing and wherein the bracket defines an air space around the outer housing for the passage of cooling air thereacross.

19. A combination as set forth in claim 18, wherein the bracket is affixed integrally to a frame of the vehicle.

* * * * *